US012789858B2

(12) United States Patent
Li et al.

(10) Patent No.: US 12,789,858 B2
(45) Date of Patent: Nov. 10, 2026

(54) PRE-TRAINING MACHINE LEARNING MODELS WITH CONTRASTIVE LEARNING

(71) Applicant: Motional AD LLC, Boston, MA (US)

(72) Inventors: Nanxiang Li, Livermore, CA (US); Bo Yang, Lexington, MA (US)

(73) Assignee: Motional AD LLC, Boston, MA (US)

( * ) Notice: Subject to any disclaimer, the term of this patent is extended or adjusted under 35 U.S.C. 154(b) by 0 days.

(21) Appl. No.: 18/286,670

(22) PCT Filed: Apr. 14, 2023

(86) PCT No.: PCT/US2023/018708

§ 371 (c)(1),
(2) Date: Oct. 12, 2023

(87) PCT Pub. No.: WO2024/215335

PCT Pub. Date: Oct. 17, 2024

(65) Prior Publication Data

US 2026/0028047 A1 Jan. 29, 2026

(51) Int. Cl.
*B60W 60/00* (2020.01)
*G06V 10/764* (2022.01)

(52) U.S. Cl.
CPC ....... *B60W 60/0027* (2020.02); *G06V 10/764* (2022.01)

(58) Field of Classification Search
None
See application file for complete search history.

(56) References Cited

U.S. PATENT DOCUMENTS 8,874,372 B1 10/2014 Zhu et al.
2017/0061625 A1 3/2017 Estrada et al.
(Continued)

FOREIGN PATENT DOCUMENTS

CA 3139449 A1 * 5/2022 ............... G06N 7/01
CN 113326717 A * 8/2021 ............ G06F 18/24
(Continued)

OTHER PUBLICATIONS

Mayank Bansal, ChauffeurNet: Learning to Drive by Imitating the Best and Synthesizing the Worst, Dec. 7, 2018, arxiv, pp. 1-20 (Year: 2018).*

[No Author Listed], "Surface Vehicle Recommended Practice: Taxonomy and Definitions for Terms Related to Driving Automation Systems for On-Road Motor Vehicles," SAE International, Standard J3016, Sep. 30, 2016, 30 pages.

(Continued)

*Primary Examiner* — Justin S Lee
(74) *Attorney, Agent, or Firm* — Fish & Richardson P.C.

(57) ABSTRACT

Provided are methods for pre-training machine learning models with contrastive learning. Some methods described also include generating, with at least one processor, a perturbed dataset from a real dataset. The method includes pre-training, with the at least one processor, at least one component of a machine leaning model to perform an alternative task, wherein the machine learning model performs a primary task. The method also includes inserting, with the at least one processor, the pre-trained at least one component into the machine learning model that performs the primary task. Additionally, the method includes training, with the at least one processor, the machine learning model comprising the pre-trained at least one component to perform the primary task. Systems and computer program products are also provided.

20 Claims, 13 Drawing Sheets

(56) References Cited

U.S. PATENT DOCUMENTS

| | | | | |
|---|---|---|---|---|
| 2017/0123419 | A1 | 5/2017 | Levinson et al. | |
| 2017/0286826 | A1 | 10/2017 | Min et al. | |
| 2021/0370921 | A1* | 12/2021 | Silva | B60W 60/0027 |
| 2022/0366263 | A1* | 11/2022 | Ji | G06N 3/0895 |
| 2022/0405574 | A1* | 12/2022 | Bathen | G06N 3/09 |
| 2023/0035995 | A1* | 2/2023 | Sun | G06V 10/82 |
| 2023/0087292 | A1* | 3/2023 | Wang | G06N 3/096 382/159 |
| 2023/0206942 | A1* | 6/2023 | Schneider | G01M 15/12 704/200 |
| 2023/0281843 | A1* | 9/2023 | Wu | G06T 7/50 382/159 |
| 2024/0202577 | A1* | 6/2024 | Bagschik | G07C 5/085 |
| 2024/0394541 | A1* | 11/2024 | Cemgil | G06N 3/084 |

FOREIGN PATENT DOCUMENTS

| | | | |
|---|---|---|---|
| CN | 109871896 B | * | 3/2022 |
| WO | WO 2019118041 | | 6/2019 |

OTHER PUBLICATIONS

International Search Report and Written Opinion in International Appln. No. PCT/US2023/018708, mailed on Jul. 11, 2023, 14 pages.

International Preliminary Report on Patentability in International Appln. No. PCT/US2023/018708, mailed on Oct. 23, 2025, 7 pages.

Extended European Search Report in European Appln. No. 23933245.5, dated May 13, 2026, 8 pages.

* cited by examiner

PRE-TRAINING MACHINE LEARNING MODELS WITH CONTRASTIVE LEARNING

BACKGROUND

Machine learning is used to perform tasks, associated with autonomous vehicle operation, including planning and prediction. Machine learning models can be trained using several approaches, such as supervised learning, semi-supervised learning, unsupervised learning, reinforcement learning, etc. In approaches such as supervised or semi-supervised learning, labeled training examples can be used to train a model to map inputs to outputs.

DETAILED DESCRIPTION

Figure 1:
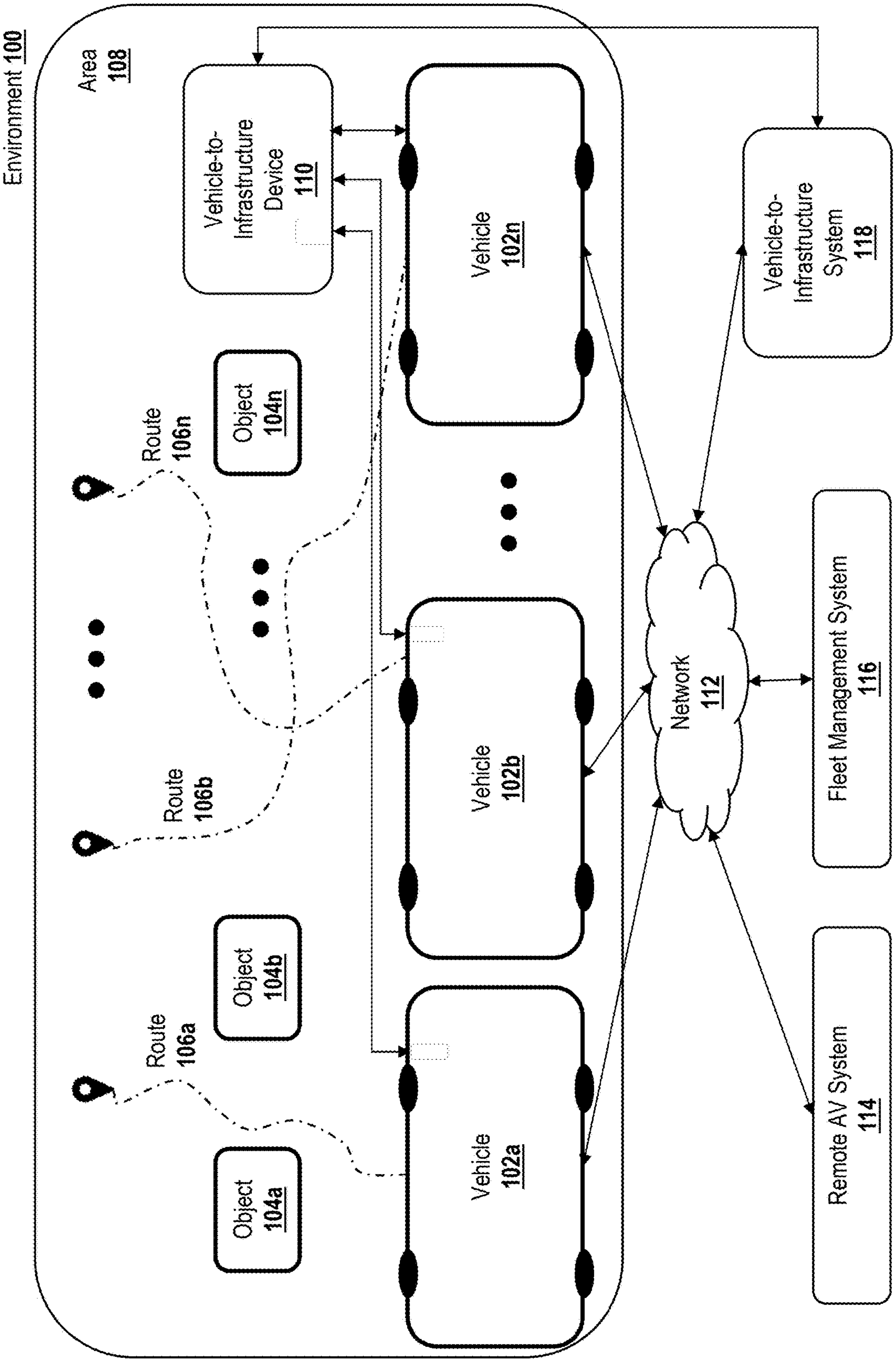
FIG. 1 is an example environment in which a vehicle including one or more components of an autonomous system can be implemented.

In the following description numerous specific details are set forth in order to provide a thorough understanding of the present disclosure for the purposes of explanation. It will be apparent, however, that the embodiments described by the present disclosure can be practiced without these specific details. In some instances, well-known structures and devices are illustrated in block diagram form in order to avoid unnecessarily obscuring aspects of the present disclosure.

Specific arrangements or orderings of schematic elements, such as those representing systems, devices, modules, instruction blocks, data elements, and/or the like are illustrated in the drawings for ease of description. However, it will be understood by those skilled in the art that the specific ordering or arrangement of the schematic elements in the drawings is not meant to imply that a particular order or sequence of processing, or separation of processes, is required unless explicitly described as such. Further, the inclusion of a schematic element in a drawing is not meant to imply that such element is required in all embodiments or that the features represented by such element may not be included in or combined with other elements in some embodiments unless explicitly described as such.

Further, where connecting elements such as solid or dashed lines or arrows are used in the drawings to illustrate a connection, relationship, or association between or among two or more other schematic elements, the absence of any such connecting elements is not meant to imply that no connection, relationship, or association can exist. In other words, some connections, relationships, or associations between elements are not illustrated in the drawings so as not to obscure the disclosure. In addition, for ease of illustration, a single connecting element can be used to represent multiple connections, relationships or associations between elements. For example, where a connecting element represents communication of signals, data, or instructions (e.g., "software instructions"), it should be understood by those skilled in the art that such element can represent one or multiple signal paths (e.g., a bus), as may be needed, to affect the communication.

Although the terms first, second, third, and/or the like are used to describe various elements, these elements should not be limited by these terms. The terms first, second, third, and/or the like are used only to distinguish one element from another. For example, a first contact could be termed a second contact and, similarly, a second contact could be termed a first contact without departing from the scope of the described embodiments. The first contact and the second contact are both contacts, but they are not the same contact.

The terminology used in the description of the various described embodiments herein is included for the purpose of describing particular embodiments only and is not intended to be limiting. As used in the description of the various described embodiments and the appended claims, the singular forms "a," "an" and "the" are intended to include the plural forms as well and can be used interchangeably with "one or more" or "at least one," unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description specify the presence of stated features, integers, steps, operations, elements, and/or components, but do not preclude the presence or addition of one or more other features, integers, steps, operations, elements, components, and/or groups thereof.

As used herein, the terms "communication" and "communicate" refer to at least one of the reception, receipt, transmission, transfer, provision, and/or the like of information (or information represented by, for example, data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some embodiments, a message may refer to a network packet (e.g., a data packet and/or the like) that includes data.

As used herein, the term "if" is, optionally, construed to mean "when", "upon", "in response to determining," "in response to detecting," and/or the like, depending on the context. Similarly, the phrase "if it is determined" or "if [a stated condition or event] is detected" is, optionally, construed to mean "upon determining," "in response to determining," "upon detecting [the stated condition or event]," "in response to detecting [the stated condition or event]," and/or the like, depending on the context. Also, as used herein, the terms "has", "have", "having", or the like are intended to be open-ended terms. Further, the phrase "based on" is intended to mean "based at least partially on" unless explicitly stated otherwise.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments can be practiced without these specific details. In other instances, well-known methods, procedures, components, circuits, and networks have not been described in detail so as not to unnecessarily obscure aspects of the embodiments.

General Overview

In some aspects and/or embodiments, systems, methods, and computer program products described herein include and/or implement pre-training machine learning models with contrastive learning. A perturbed dataset is generated from a real dataset. The real dataset is, for example, a real world driving log. In examples, generating the perturbed dataset comprises modifying a past trajectory of an autonomous vehicle, a future trajectory of the autonomous vehicle, trajectories of actors, adding or removing lanes, adding or removing actors, or any combinations thereof. At least one component of a machine leaning model is pre-trained to perform an alternative task, wherein the machine learning model performs a primary task. In examples, the alternative task is a classification task, and the primary task is a planning or prediction task. The pre-trained at least one component is inserted into the machine learning model that performs the primary task, and the machine learning model comprising the pre-trained at least one component is trained to perform the primary task.

By virtue of the implementation of systems, methods, and computer program products described herein, techniques for pre-training machine learning models with contrastive learning enables a reduction in training time when new training data is available. The present techniques use expanded datasets to learn high level features. The expanded training datasets are generated by applying perturbations to the real dataset. These transformations can be used to create edge cases that do not occur in real world data, such as collisions and trajectories that venture off of drivable areas. By pre-training components using the expanded dataset, the components learn high level features. The pre-trained components reduce the time consumed when training a machine learning model (including the pre-trained components) to perform a primary task.

Referring now to FIG. 1, illustrated is example environment 100 in which vehicles that include autonomous systems, as well as vehicles that do not, are operated. As illustrated, environment 100 includes vehicles 102*a*-102*n*, objects 104*a*-104*n*, routes 106*a*-106*n*, area 108, vehicle-to-infrastructure (V2I) device 110, network 112, remote autonomous vehicle (AV) system 114, fleet management system 116, and V2I system 118. Vehicles 102*a*-102*n*, vehicle-to-infrastructure (V2I) device 110, network 112, autonomous vehicle (AV) system 114, fleet management system 116, and V2I system 118 interconnect (e.g., establish a connection to communicate and/or the like) via wired connections, wireless connections, or a combination of wired or wireless connections. In some embodiments, objects 104*a*-104*n* interconnect with at least one of vehicles 102*a*-102*n*, vehicle-to-infrastructure (V2I) device 110, network 112, autonomous vehicle (AV) system 114, fleet management system 116, and V2I system 118 via wired connections, wireless connections, or a combination of wired or wireless connections.

Vehicles 102*a*-102*n* (referred to individually as vehicle 102 and collectively as vehicles 102) include at least one device configured to transport goods and/or people. In some embodiments, vehicles 102 are configured to be in communication with V2I device 110, remote AV system 114, fleet management system 116, and/or V2I system 118 via network 112. In some embodiments, vehicles 102 include cars, buses, trucks, trains, and/or the like. In some embodiments, vehicles 102 are the same as, or similar to, vehicles 200, described herein (see FIG. 2). In some embodiments, a vehicle 200 of a set of vehicles 200 is associated with an autonomous fleet manager. In some embodiments, vehicles 102 travel along respective routes 106*a*-106*n* (referred to individually as route 106 and collectively as routes 106), as described herein. In some embodiments, one or more vehicles 102 include an autonomous system (e.g., an autonomous system that is the same as or similar to autonomous system 202).

Objects 104*a*-104*n* (referred to individually as object 104 and collectively as objects 104) include, for example, at least one vehicle, at least one pedestrian, at least one cyclist, at least one structure (e.g., a building, a sign, a fire hydrant, etc.), and/or the like. Each object 104 is stationary (e.g., located at a fixed location for a period of time) or mobile (e.g., having a velocity and associated with at least one trajectory). In some embodiments, objects 104 are associated with corresponding locations in area 108.

Routes 106*a*-106*n* (referred to individually as route 106 and collectively as routes 106) are each associated with (e.g., prescribe) a sequence of actions (also known as a trajectory) connecting states along which an AV can navigate. Each route 106 starts at an initial state (e.g., a state that corresponds to a first spatiotemporal location, velocity, and/or the like) and ends at a final goal state (e.g., a state that corresponds to a second spatiotemporal location that is different from the first spatiotemporal location) or goal region (e.g. a subspace of acceptable states (e.g., terminal states)). In some embodiments, the first state includes a location at which an individual or individuals are to be picked-up by the AV and the second state or region includes a location or locations at which the individual or individuals picked-up by the AV are to be dropped-off. In some embodiments, routes 106 include a plurality of acceptable state sequences (e.g., a plurality of spatiotemporal location sequences), the plurality of state sequences associated with (e.g., defining) a plurality of trajectories. In an example, routes 106 include only high level actions or imprecise state locations, such as a series of connected roads dictating turning directions at roadway intersections. Additionally, or alternatively, routes 106 may include more precise actions or states such as, for example, specific target lanes or precise locations within the lane areas and targeted speed at those positions. In an example, routes 106 include a plurality of precise state sequences along the at least one high level action sequence with a limited lookahead horizon to reach intermediate goals, where the combination of successive iterations of limited horizon state sequences cumulatively correspond to a plurality of trajectories that collectively form the high level route to terminate at the final goal state or region.

Area 108 includes a physical area (e.g., a geographic region) within which vehicles 102 can navigate. In an example, area 108 includes at least one state (e.g., a country, a province, an individual state of a plurality of states included in a country, etc.), at least one portion of a state, at least one city, at least one portion of a city, etc. In some embodiments, area 108 includes at least one named thoroughfare (referred to herein as a "road") such as a highway, an interstate highway, a parkway, a city street, etc. Additionally, or alternatively, in some examples area 108 includes at least one unnamed road such as a driveway, a section of a parking lot, a section of a vacant and/or undeveloped lot, a dirt path, etc. In some embodiments, a road includes at least one lane (e.g., a portion of the road that can be traversed by vehicles 102). In an example, a road includes at least one lane associated with (e.g., identified based on) at least one lane marking.

Vehicle-to-Infrastructure (V2I) device 110 (sometimes referred to as a Vehicle-to-Infrastructure or Vehicle-to-Everything (V2X) device) includes at least one device configured to be in communication with vehicles 102 and/or V2I infrastructure system 118. In some embodiments, V2I device 110 is configured to be in communication with vehicles 102, remote AV system 114, fleet management system 116, and/or V2I system 118 via network 112. In some embodiments, V2I device 110 includes a radio frequency identification (RFID) device, signage, cameras (e.g., two-dimensional (2D) and/or three-dimensional (3D) cameras), lane markers, streetlights, parking meters, etc. In some embodiments, V2I device 110 is configured to communicate directly with vehicles 102. Additionally, or alternatively, in some embodiments V2I device 110 is configured to communicate with vehicles 102, remote AV system 114, and/or fleet management system 116 via V2I system 118. In some embodiments, V2I device 110 is configured to communicate with V2I system 118 via network 112.

Network 112 includes one or more wired and/or wireless networks. In an example, network 112 includes a cellular network (e.g., a long term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN), a private network, an ad hoc network, an intranet, the Internet, a fiber optic-based network, a cloud computing network, etc., a combination of some or all of these networks, and/or the like.

Remote AV system 114 includes at least one device configured to be in communication with vehicles 102, V2I device 110, network 112, fleet management system 116, and/or V2I system 118 via network 112. In an example, remote AV system 114 includes a server, a group of servers, and/or other like devices. In some embodiments, remote AV system 114 is co-located with the fleet management system 116. In some embodiments, remote AV system 114 is involved in the installation of some or all of the components of a vehicle, including an autonomous system, an autonomous vehicle compute, software implemented by an autonomous vehicle compute, and/or the like. In some embodiments, remote AV system 114 maintains (e.g., updates and/or replaces) such components and/or software during the lifetime of the vehicle.

Fleet management system 116 includes at least one device configured to be in communication with vehicles 102, V2I device 110, remote AV system 114, and/or V2I infrastructure system 118. In an example, fleet management system 116 includes a server, a group of servers, and/or other like devices. In some embodiments, fleet management system 116 is associated with a ridesharing company (e.g., an organization that controls operation of multiple vehicles (e.g., vehicles that include autonomous systems and/or vehicles that do not include autonomous systems) and/or the like).

In some embodiments, V2I system 118 includes at least one device configured to be in communication with vehicles 102, V2I device 110, remote AV system 114, and/or fleet management system 116 via network 112. In some examples, V2I system 118 is configured to be in communication with V2I device 110 via a connection different from network 112. In some embodiments, V2I system 118 includes a server, a group of servers, and/or other like devices. In some embodiments, V2I system 118 is associated with a municipality or a private institution (e.g., a private institution that maintains V2I device 110 and/or the like).

The number and arrangement of elements illustrated in FIG. 1 are provided as an example. There can be additional elements, fewer elements, different elements, and/or differently arranged elements, than those illustrated in FIG. 1. Additionally, or alternatively, at least one element of environment 100 can perform one or more functions described as being performed by at least one different element of FIG. 1. Additionally, or alternatively, at least one set of elements of environment 100 can perform one or more functions described as being performed by at least one different set of elements of environment 100.

Figure 2:
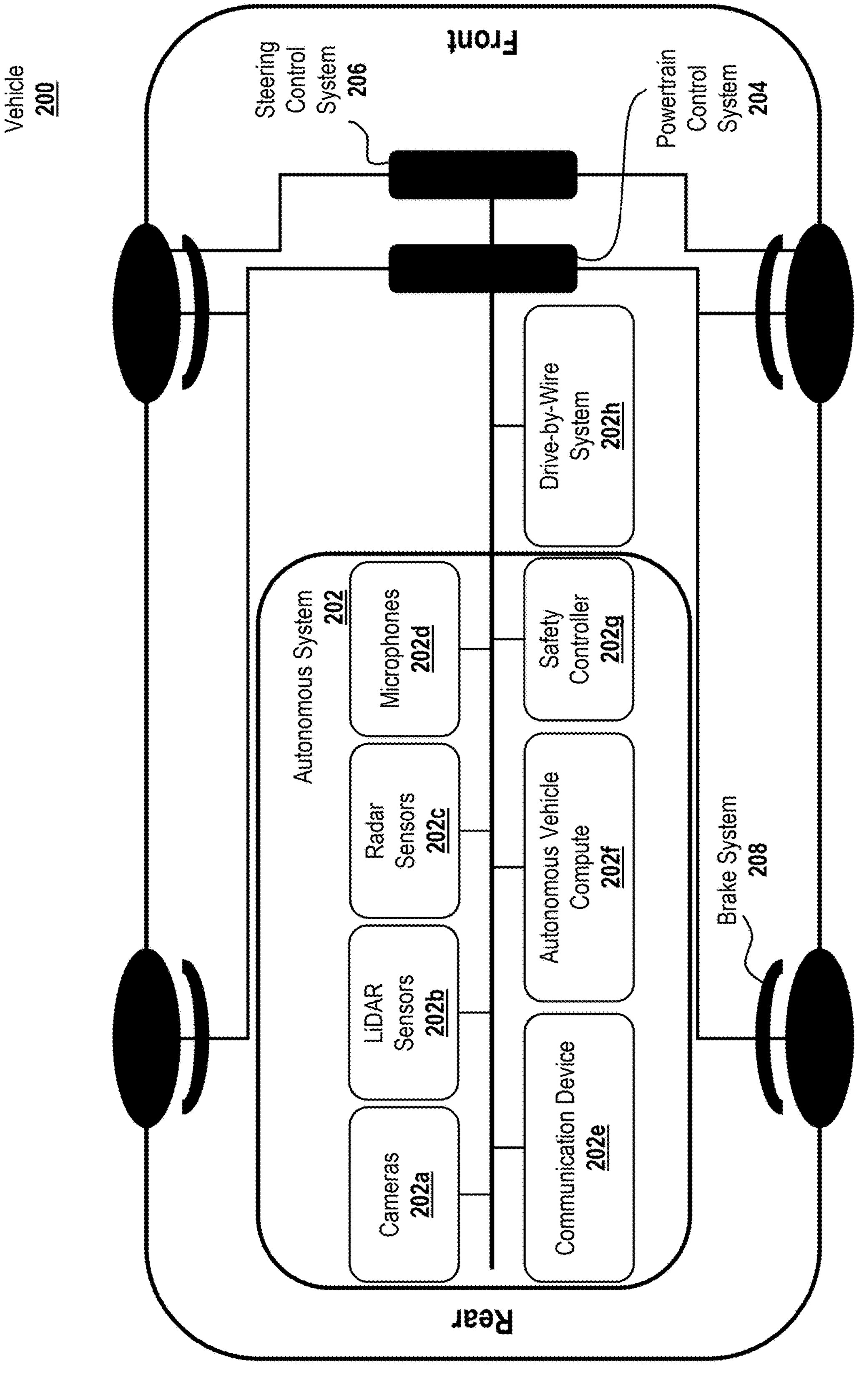
FIG. 2 is a diagram of one or more systems of a vehicle including an autonomous system.

Referring now to FIG. 2, vehicle 200 (which may be the same as, or similar to vehicles 102 of FIG. 1) includes or is associated with autonomous system 202, powertrain control system 204, steering control system 206, and brake system 208. In some embodiments, vehicle 200 is the same as or similar to vehicle 102 (see FIG. 1). In some embodiments, autonomous system 202 is configured to confer vehicle 200 autonomous driving capability (e.g., implement at least one driving automation or maneuver-based function, feature, device, and/or the like that enable vehicle 200 to be partially or fully operated without human intervention including, without limitation, fully autonomous vehicles (e.g., vehicles that forego reliance on human intervention such as Level 5 ADS-operated vehicles), highly autonomous vehicles (e.g., vehicles that forego reliance on human intervention in certain situations such as Level 4 ADS-operated vehicles), conditional autonomous vehicles (e.g., vehicles that forego reliance on human intervention in limited situations such as Level 3 ADS-operated vehicles) and/or the like. In one embodiment, autonomous system 202 includes operational or tactical functionality required to operate vehicle 200 in on-road traffic and perform part or all of Dynamic Driving Task (DDT) on a sustained basis. In another embodiment, autonomous system 202 includes an Advanced Driver Assistance System (ADAS) that includes driver support features. Autonomous system 202 supports various levels of driving automation, ranging from no driving automation (e.g., Level 0) to full driving automation (e.g., Level 5). For a detailed description of fully autonomous vehicles and highly autonomous vehicles, reference may be made to SAE International's standard J3016: Taxonomy and Definitions for Terms Related to On-Road Motor Vehicle Automated Driving Systems, which is incorporated by reference in its entirety. In some embodiments, vehicle 200 is associated with an autonomous fleet manager and/or a ridesharing company.

Autonomous system 202 includes a sensor suite that includes one or more devices such as cameras 202*a*, LiDAR sensors 202*b*, radar sensors 202*c*, and microphones 202*d*. In some embodiments, autonomous system 202 can include more or fewer devices and/or different devices (e.g., ultrasonic sensors, inertial sensors, GPS receivers (discussed below), odometry sensors that generate data associated with an indication of a distance that vehicle 200 has traveled, and/or the like). In some embodiments, autonomous system 202 uses the one or more devices included in autonomous system 202 to generate data associated with environment 100, described herein. The data generated by the one or more devices of autonomous system 202 can be used by one or more systems described herein to observe the environment (e.g., environment 100) in which vehicle 200 is located. In some embodiments, autonomous system 202 includes communication device 202*e*, autonomous vehicle compute 202*f*, drive-by-wire (DBW) system 202*h*, and safety controller 202*g*.

Figure 3:
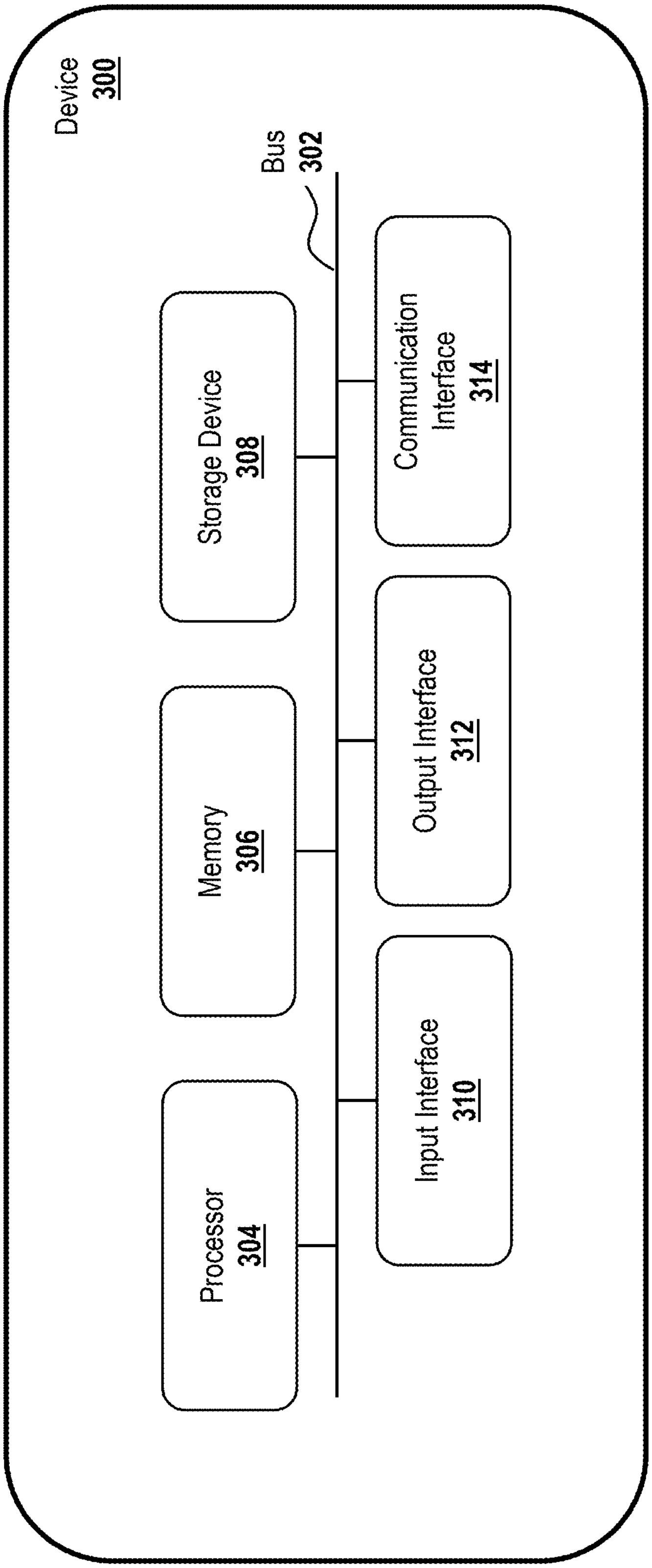
FIG. 3 is a diagram of components of one or more devices and/or one or more systems of FIGS. 1 and 2.

Cameras 202*a* include at least one device configured to be in communication with communication device 202*e*, autonomous vehicle compute 202*f*, and/or safety controller 202*g* via a bus (e.g., a bus that is the same as or similar to bus 302 of FIG. 3). Cameras 202*a* include at least one camera (e.g., a digital camera using a light sensor such as a Charge-Coupled Device (CCD), a thermal camera, an infrared (IR) camera, an event camera, and/or the like) to capture images including physical objects (e.g., cars, buses, curbs, people, and/or the like). In some embodiments, camera 202*a* generates camera data as output. In some examples, camera 202*a* generates camera data that includes image data associated with an image. In this example, the image data may specify at least one parameter (e.g., image characteristics such as exposure, brightness, etc., an image timestamp, and/or the like) corresponding to the image. In such an example, the image may be in a format (e.g., RAW, JPEG, PNG, and/or the like). In some embodiments, camera 202*a* includes a plurality of independent cameras configured on (e.g., positioned on) a vehicle to capture images for the purpose of stereopsis (stereo vision). In some examples, camera 202*a* includes a plurality of cameras that generate image data and transmit the image data to autonomous vehicle compute 202*f* and/or a fleet management system (e.g., a fleet management system that is the same as or similar to fleet management system 116 of FIG. 1). In such an example, autonomous vehicle compute 202*f* determines depth to one or more objects in a field of view of at least two cameras of the plurality of cameras based on the image data from the at least two cameras. In some embodiments, cameras 202*a* is configured to capture images of objects within a distance from cameras 202*a* (e.g., up to 100 meters, up to a kilometer, and/or the like). Accordingly, cameras 202*a* include features such as sensors and lenses that are optimized for perceiving objects that are at one or more distances from cameras 202*a*.

In an embodiment, camera 202*a* includes at least one camera configured to capture one or more images associated with one or more traffic lights, street signs and/or other physical objects that provide visual navigation information. In some embodiments, camera 202*a* generates traffic light data associated with one or more images. In some examples, camera 202*a* generates TLD (Traffic Light Detection) data associated with one or more images that include a format (e.g., RAW, JPEG, PNG, and/or the like). In some embodiments, camera 202*a* that generates TLD data differs from other systems described herein incorporating cameras in that camera 202*a* can include one or more cameras with a wide field of view (e.g., a wide-angle lens, a fish-eye lens, a lens having a viewing angle of approximately 120 degrees or more, and/or the like) to generate images about as many physical objects as possible.

Light Detection and Ranging (LiDAR) sensors 202*b* include at least one device configured to be in communication with communication device 202*e*, autonomous vehicle compute 202*f*, and/or safety controller 202*g* via a bus (e.g., a bus that is the same as or similar to bus 302 of FIG. 3). LiDAR sensors 202*b* include a system configured to transmit light from a light emitter (e.g., a laser transmitter). Light emitted by LiDAR sensors 202*b* include light (e.g., infrared light and/or the like) that is outside of the visible spectrum. In some embodiments, during operation, light emitted by LiDAR sensors 202*b* encounters a physical object (e.g., a vehicle) and is reflected back to LiDAR sensors 202*b*. In some embodiments, the light emitted by LiDAR sensors 202*b* does not penetrate the physical objects that the light encounters. LiDAR sensors 202*b* also include at least one light detector which detects the light that was emitted from the light emitter after the light encounters a physical object. In some embodiments, at least one data processing system associated with LiDAR sensors 202*b* generates an image (e.g., a point cloud, a combined point cloud, and/or the like) representing the objects included in a field of view of LiDAR sensors 202*b*. In some examples, the at least one data processing system associated with LiDAR sensor 202*b* generates an image that represents the boundaries of a physical object, the surfaces (e.g., the topology of the surfaces) of the physical object, and/or the like. In such an example, the image is used to determine the boundaries of physical objects in the field of view of LiDAR sensors 202*b*.

Radio Detection and Ranging (radar) sensors 202*c* include at least one device configured to be in communication with communication device 202*e*, autonomous vehicle compute 202*f*, and/or safety controller 202*g* via a bus (e.g., a bus that is the same as or similar to bus 302 of FIG. 3). Radar sensors 202*c* include a system configured to transmit radio waves (either pulsed or continuously). The radio waves transmitted by radar sensors 202*c* include radio waves that are within a predetermined spectrum. In some embodiments, during operation, radio waves transmitted by radar sensors 202*c* encounter a physical object and are reflected back to radar sensors 202*c*. In some embodiments, the radio waves transmitted by radar sensors 202*c* are not reflected by some objects. In some embodiments, at least one data processing system associated with radar sensors 202*c* generates signals representing the objects included in a field of view of radar sensors 202*c*. For example, the at least one data processing system associated with radar sensor 202*c* generates an image that represents the boundaries of a physical object, the surfaces (e.g., the topology of the surfaces) of the physical object, and/or the like. In some examples, the image is used to determine the boundaries of physical objects in the field of view of radar sensors 202*c*.

Microphones 202*d* includes at least one device configured to be in communication with communication device 202*e*, autonomous vehicle compute 202*f*, and/or safety controller 202*g* via a bus (e.g., a bus that is the same as or similar to bus 302 of FIG. 3). Microphones 202*d* include one or more microphones (e.g., array microphones, external microphones, and/or the like) that capture audio signals and generate data associated with (e.g., representing) the audio signals. In some examples, microphones 202*d* include transducer devices and/or like devices. In some embodiments, one or more systems described herein can receive the data generated by microphones 202*d* and determine a position of an object relative to vehicle 200 (e.g., a distance and/or the like) based on the audio signals associated with the data.

Communication device 202*e* includes at least one device configured to be in communication with cameras 202*a*, LiDAR sensors 202*b*, radar sensors 202*c*, microphones 202*d*, autonomous vehicle compute 202*f*, safety controller 202*g*, and/or DBW (Drive-By-Wire) system 202*h*. For example, communication device 202*e* may include a device that is the same as or similar to communication interface 314 of FIG. 3. In some embodiments, communication device 202*e* includes a vehicle-to-vehicle (V2V) communication device (e.g., a device that enables wireless communication of data between vehicles).

Autonomous vehicle compute 202*f* include at least one device configured to be in communication with cameras 202*a*, LiDAR sensors 202*b*, radar sensors 202*c*, microphones 202*d*, communication device 202*e*, safety controller 202*g*, and/or DBW system 202*h*. In some examples, autonomous vehicle compute 202*f* includes a device such as a client device, a mobile device (e.g., a cellular telephone, a tablet, and/or the like), a server (e.g., a computing device including one or more central processing units, graphical processing units, and/or the like), and/or the like. In some embodiments, autonomous vehicle compute 202*f* is the same as or similar to autonomous vehicle compute 400, described herein. Additionally, or alternatively, in some embodiments autonomous vehicle compute 202*f* is configured to be in communication with an autonomous vehicle system (e.g., an autonomous vehicle system that is the same as or similar to remote AV system 114 of FIG. 1), a fleet management system (e.g., a fleet management system that is the same as or similar to fleet management system 116 of FIG. 1), a V2I device (e.g., a V2I device that is the same as or similar to V2I device 110 of FIG. 1), and/or a V2I system (e.g., a V2I system that is the same as or similar to V2I system 118 of FIG. 1).

Safety controller 202*g* includes at least one device configured to be in communication with cameras 202*a*, LiDAR sensors 202*b*, radar sensors 202*c*, microphones 202*d*, communication device 202*e*, autonomous vehicle computer 202*f*, and/or DBW system 202*h*. In some examples, safety controller 202*g* includes one or more controllers (electrical controllers, electromechanical controllers, and/or the like) that are configured to generate and/or transmit control signals to operate one or more devices of vehicle 200 (e.g., powertrain control system 204, steering control system 206, brake system 208, and/or the like). In some embodiments, safety controller 202*g* is configured to generate control signals that take precedence over (e.g., overrides) control signals generated and/or transmitted by autonomous vehicle compute 202*f*.

DBW system 202*h* includes at least one device configured to be in communication with communication device 202*e* and/or autonomous vehicle compute 202*f*. In some examples, DBW system 202*h* includes one or more controllers (e.g., electrical controllers, electromechanical controllers, and/or the like) that are configured to generate and/or transmit control signals to operate one or more devices of vehicle 200 (e.g., powertrain control system 204, steering control system 206, brake system 208, and/or the like). Additionally, or alternatively, the one or more controllers of DBW system 202*h* are configured to generate and/or transmit control signals to operate at least one different device (e.g., a turn signal, headlights, door locks, windshield wipers, and/or the like) of vehicle 200.

Powertrain control system 204 includes at least one device configured to be in communication with DBW system 202*h*. In some examples, powertrain control system 204 includes at least one controller, actuator, and/or the like. In some embodiments, powertrain control system 204 receives control signals from DBW system 202*h* and powertrain control system 204 causes vehicle 200 to make longitudinal vehicle motion, such as start moving forward, stop moving forward, start moving backward, stop moving backward, accelerate in a direction, decelerate in a direction or to make lateral vehicle motion such as performing a left turn, performing a right turn, and/or the like. In an example, powertrain control system 204 causes the energy (e.g., fuel, electricity, and/or the like) provided to a motor of the vehicle to increase, remain the same, or decrease, thereby causing at least one wheel of vehicle 200 to rotate or not rotate.

Steering control system 206 includes at least one device configured to rotate one or more wheels of vehicle 200. In some examples, steering control system 206 includes at least one controller, actuator, and/or the like. In some embodiments, steering control system 206 causes the front two wheels and/or the rear two wheels of vehicle 200 to rotate to the left or right to cause vehicle 200 to turn to the left or right. In other words, steering control system 206 causes activities necessary for the regulation of the y-axis component of vehicle motion.

Brake system 208 includes at least one device configured to actuate one or more brakes to cause vehicle 200 to reduce speed and/or remain stationary. In some examples, brake system 208 includes at least one controller and/or actuator that is configured to cause one or more calipers associated with one or more wheels of vehicle 200 to close on a corresponding rotor of vehicle 200. Additionally, or alternatively, in some examples brake system 208 includes an automatic emergency braking (AEB) system, a regenerative braking system, and/or the like.

In some embodiments, vehicle 200 includes at least one platform sensor (not explicitly illustrated) that measures or infers properties of a state or a condition of vehicle 200. In some examples, vehicle 200 includes platform sensors such as a global positioning system (GPS) receiver, an inertial measurement unit (IMU), a wheel speed sensor, a wheel brake pressure sensor, a wheel torque sensor, an engine torque sensor, a steering angle sensor, and/or the like. Although brake system 208 is illustrated to be located in the near side of vehicle 200 in FIG. 2, brake system 208 may be located anywhere in vehicle 200.

Referring now to FIG. 3, illustrated is a schematic diagram of a device 300. As illustrated, device 300 includes processor 304, memory 306, storage component 308, input interface 310, output interface 312, communication interface 314, and bus 302. In some embodiments, device 300 corresponds to at least one device of vehicles 102 (e.g., at least one device of a system of vehicles 102), and/or one or more devices of network 112 (e.g., one or more devices of a system of network 112). In some embodiments, one or more devices of vehicles 102 (e.g., one or more devices of a system of vehicles 102), and/or one or more devices of network 112 (e.g., one or more devices of a system of network 112) include at least one device 300 and/or at least one component of device 300. As shown in FIG. 3, device 300 includes bus 302, processor 304, memory 306, storage component 308, input interface 310, output interface 312, and communication interface 314.

Bus 302 includes a component that permits communication among the components of device 300. In some cases, processor 304 includes a processor (e.g., a central processing unit (CPU), a graphics processing unit (GPU), an accelerated processing unit (APU), and/or the like), a microphone, a digital signal processor (DSP), and/or any processing component (e.g., a field-programmable gate array (FPGA), an application specific integrated circuit (ASIC), and/or the like) that can be programmed to perform at least one function. Memory 306 includes random access memory (RAM), read-only memory (ROM), and/or another type of dynamic and/or static storage device (e.g., flash memory, magnetic memory, optical memory, and/or the like) that stores data and/or instructions for use by processor 304.

Storage component 308 stores data and/or software related to the operation and use of device 300. In some examples, storage component 308 includes a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, a CD-ROM, RAM, PROM, EPROM, FLASH-EPROM, NV-RAM, and/or another type of computer readable medium, along with a corresponding drive.

Input interface 310 includes a component that permits device 300 to receive information, such as via user input (e.g., a touchscreen display, a keyboard, a keypad, a mouse, a button, a switch, a microphone, a camera, and/or the like). Additionally or alternatively, in some embodiments input interface 310 includes a sensor that senses information (e.g., a global positioning system (GPS) receiver, an accelerometer, a gyroscope, an actuator, and/or the like). Output interface 312 includes a component that provides output information from device 300 (e.g., a display, a speaker, one or more light-emitting diodes (LEDs), and/or the like).

In some embodiments, communication interface 314 includes a transceiver-like component (e.g., a transceiver, a separate receiver and transmitter, and/or the like) that permits device 300 to communicate with other devices via a wired connection, a wireless connection, or a combination of wired and wireless connections. In some examples, communication interface 314 permits device 300 to receive information from another device and/or provide information to another device. In some examples, communication interface 314 includes an Ethernet interface, an optical interface, a coaxial interface, an infrared interface, a radio frequency (RF) interface, a universal serial bus (USB) interface, a Wi-Fi® interface, a cellular network interface, and/or the like.

In some embodiments, device 300 performs one or more processes described herein. Device 300 performs these processes based on processor 304 executing software instructions stored by a computer-readable medium, such as memory 305 and/or storage component 308. A computer-readable medium (e.g., a non-transitory computer readable medium) is defined herein as a non-transitory memory device. A non-transitory memory device includes memory space located inside a single physical storage device or memory space spread across multiple physical storage devices.

In some embodiments, software instructions are read into memory 306 and/or storage component 308 from another computer-readable medium or from another device via communication interface 314. When executed, software instructions stored in memory 306 and/or storage component 308 cause processor 304 to perform one or more processes described herein. Additionally or alternatively, hardwired circuitry is used in place of or in combination with software instructions to perform one or more processes described herein. Thus, embodiments described herein are not limited to any specific combination of hardware circuitry and software unless explicitly stated otherwise.

Memory 306 and/or storage component 308 includes data storage or at least one data structure (e.g., a database and/or the like). Device 300 is capable of receiving information from, storing information in, communicating information to, or searching information stored in the data storage or the at least one data structure in memory 306 or storage component 308. In some examples, the information includes network data, input data, output data, or any combination thereof.

In some embodiments, device 300 is configured to execute software instructions that are either stored in memory 306 and/or in the memory of another device (e.g., another device that is the same as or similar to device 300). As used herein, the term "module" refers to at least one instruction stored in memory 306 and/or in the memory of another device that, when executed by processor 304 and/or by a processor of another device (e.g., another device that is the same as or similar to device 300) cause device 300 (e.g., at least one component of device 300) to perform one or more processes described herein. In some embodiments, a module is implemented in software, firmware, hardware, and/or the like.

The number and arrangement of components illustrated in FIG. 3 are provided as an example. In some embodiments, device 300 can include additional components, fewer components, different components, or differently arranged components than those illustrated in FIG. 3. Additionally or alternatively, a set of components (e.g., one or more components) of device 300 can perform one or more functions described as being performed by another component or another set of components of device 300.

Figure 4A:
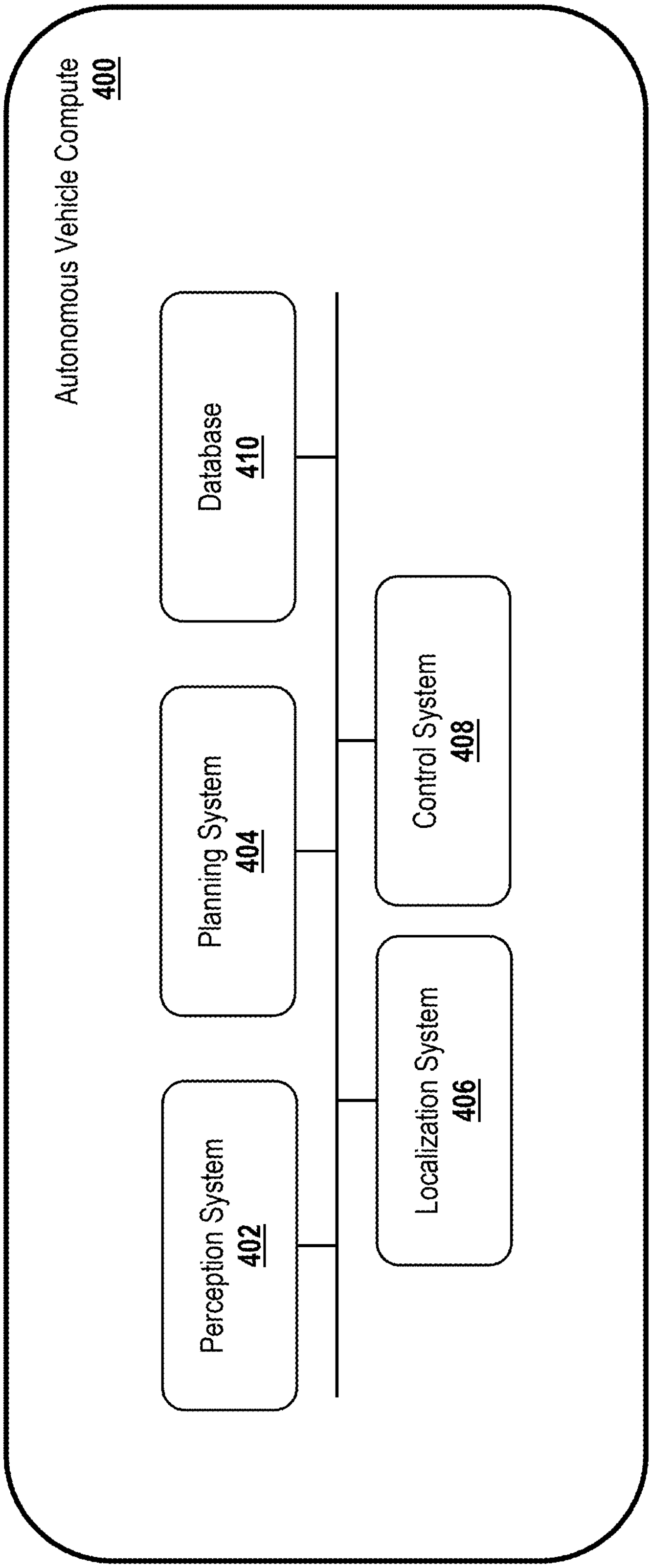
FIG. 4A is a diagram of certain components of an autonomous system.

Referring now to FIG. 4A, illustrated is an example block diagram of an autonomous vehicle compute 400 (sometimes referred to as an "AV stack"). As illustrated, autonomous vehicle compute 400 includes perception system 402 (sometimes referred to as a perception module), planning system 404 (sometimes referred to as a planning module), localization system 406 (sometimes referred to as a localization module), control system 408 (sometimes referred to as a control module), and database 410. In some embodiments, perception system 402, planning system 404, localization system 406, control system 408, and database 410 are included and/or implemented in an autonomous navigation system of a vehicle (e.g., autonomous vehicle compute **202*f* of vehicle 200). Additionally, or alternatively, in some embodiments perception system 402, planning system 404, localization system 406, control system 408, and database 410 are included in one or more standalone systems (e.g., one or more systems that are the same as or similar to autonomous vehicle compute 400 and/or the like). In some examples, perception system 402, planning system 404, localization system 406, control system 408, and database 410 are included in one or more standalone systems that are located in a vehicle and/or at least one remote system as described herein. In some embodiments, any and/or all of the systems included in autonomous vehicle compute 400 are implemented in software (e.g., in software instructions stored in memory), computer hardware (e.g., by microprocessors, microcontrollers, application-specific integrated circuits (ASICs), Field Programmable Gate Arrays (FPGAs), and/or the like), or combinations of computer software and computer hardware. It will also be understood that, in some embodiments, autonomous vehicle compute 400 is configured to be in communication with a remote system (e.g., an autonomous vehicle system that is the same as or similar to remote AV system 114, a fleet management system 116 that is the same as or similar to fleet management system 116, a V2I system that is the same as or similar to V2I system 118**, and/or the like).

In some embodiments, perception system 402 receives data associated with at least one physical object (e.g., data that is used by perception system 402 to detect the at least one physical object) in an environment and classifies the at least one physical object. In some examples, perception system 402 receives image data captured by at least one camera (e.g., cameras 202*a*), the image associated with (e.g., representing) one or more physical objects within a field of view of the at least one camera. In such an example, perception system 402 classifies at least one physical object based on one or more groupings of physical objects (e.g., bicycles, vehicles, traffic signs, pedestrians, and/or the like). In some embodiments, perception system 402 transmits data associated with the classification of the physical objects to planning system 404 based on perception system 402 classifying the physical objects.

In some embodiments, planning system 404 receives data associated with a destination and generates data associated with at least one route (e.g., routes 106) along which a vehicle (e.g., vehicles 102) can travel along toward a destination. In some embodiments, planning system 404 periodically or continuously receives data from perception system 402 (e.g., data associated with the classification of physical objects, described above) and planning system 404 updates the at least one trajectory or generates at least one different trajectory based on the data generated by perception system 402. In other words, planning system 404 may perform tactical function-related tasks that are required to operate vehicle 102 in on-road traffic. Tactical efforts involve maneuvering the vehicle in traffic during a trip, including but not limited to deciding whether and when to overtake another vehicle, change lanes, or selecting an appropriate speed, acceleration, deacceleration, etc. In some embodiments, planning system 404 receives data associated with an updated position of a vehicle (e.g., vehicles 102) from localization system 406 and planning system 404 updates the at least one trajectory or generates at least one different trajectory based on the data generated by localization system 406.

In some embodiments, localization system 406 receives data associated with (e.g., representing) a location of a vehicle (e.g., vehicles 102) in an area. In some examples, localization system 406 receives LiDAR data associated with at least one point cloud generated by at least one LiDAR sensor (e.g., LiDAR sensors 202*b*). In certain examples, localization system 406 receives data associated with at least one point cloud from multiple LiDAR sensors and localization system 406 generates a combined point cloud based on each of the point clouds. In these examples, localization system 406 compares the at least one point cloud or the combined point cloud to two-dimensional (2D) and/or a three-dimensional (3D) map of the area stored in database 410. Localization system 406 then determines the position of the vehicle in the area based on localization system 406 comparing the at least one point cloud or the combined point cloud to the map. In some embodiments, the map includes a combined point cloud of the area generated prior to navigation of the vehicle. In some embodiments, maps include, without limitation, high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations thereof), and maps describing the spatial locations of road features such as crosswalks, traffic signs or other travel signals of various types. In some embodiments, the map is generated in real-time based on the data received by the perception system.

In another example, localization system 406 receives Global Navigation Satellite System (GNSS) data generated by a global positioning system (GPS) receiver. In some examples, localization system 406 receives GNSS data associated with the location of the vehicle in the area and localization system 406 determines a latitude and longitude of the vehicle in the area. In such an example, localization system 406 determines the position of the vehicle in the area based on the latitude and longitude of the vehicle. In some embodiments, localization system 406 generates data associated with the position of the vehicle. In some examples, localization system 406 generates data associated with the position of the vehicle based on localization system 406 determining the position of the vehicle. In such an example, the data associated with the position of the vehicle includes data associated with one or more semantic properties corresponding to the position of the vehicle.

In some embodiments, control system 408 receives data associated with at least one trajectory from planning system 404 and control system 408 controls operation of the vehicle. In some examples, control system 408 receives data associated with at least one trajectory from planning system 404 and control system 408 controls operation of the vehicle by generating and transmitting control signals to cause a powertrain control system (e.g., DBW system 202*h*, powertrain control system 204, and/or the like), a steering control system (e.g., steering control system 206), and/or a brake system (e.g., brake system 208) to operate. For example, control system 408 is configured to perform operational functions such as a lateral vehicle motion control or a longitudinal vehicle motion control. The lateral vehicle motion control causes activities necessary for the regulation of the y-axis component of vehicle motion. The longitudinal vehicle motion control causes activities necessary for the regulation of the x-axis component of vehicle motion. In an example, where a trajectory includes a left turn, control system 408 transmits a control signal to cause steering control system 206 to adjust a steering angle of vehicle 200, thereby causing vehicle 200 to turn left. Additionally, or alternatively, control system 408 generates and transmits control signals to cause other devices (e.g., headlights, turn signal, door locks, windshield wipers, and/or the like) of vehicle 200 to change states.

In some embodiments, perception system 402, planning system 404, localization system 406, and/or control system 408 implement at least one machine learning model (e.g., at least one multilayer perceptron (MLP), at least one convolutional neural network (CNN), at least one recurrent neural network (RNN), at least one autoencoder, at least one transformer, and/or the like). In some examples, perception system 402, planning system 404, localization system 406, and/or control system 408 implement at least one machine learning model alone or in combination with one or more of the above-noted systems. In some examples, perception system 402, planning system 404, localization system 406, and/or control system 408 implement at least one machine learning model as part of a pipeline (e.g., a pipeline for identifying one or more objects located in an environment and/or the like). An example of an implementation of a machine learning model is included below with respect to FIGS. 4B-4D.

Database 410 stores data that is transmitted to, received from, and/or updated by perception system 402, planning system 404, localization system 406 and/or control system 408. In some examples, database 410 includes a storage component (e.g., a storage component that is the same as or similar to storage component 308 of FIG. 3) that stores data and/or software related to the operation and uses at least one system of autonomous vehicle compute 400. In some embodiments, database 410 stores data associated with 2D and/or 3D maps of at least one area. In some examples, database 410 stores data associated with 2D and/or 3D maps of a portion of a city, multiple portions of multiple cities, multiple cities, a county, a state, a State (e.g., a country), and/or the like). In such an example, a vehicle (e.g., a vehicle that is the same as or similar to vehicles 102 and/or vehicle 200) can drive along one or more drivable regions (e.g., single-lane roads, multi-lane roads, highways, back roads, off road trails, and/or the like) and cause at least one LiDAR sensor (e.g., a LIDAR sensor that is the same as or similar to LiDAR sensors 202*b*) to generate data associated with an image representing the objects included in a field of view of the at least one LiDAR sensor.

In some embodiments, database 410 can be implemented across a plurality of devices. In some examples, database 410 is included in a vehicle (e.g., a vehicle that is the same as or similar to vehicles 102 and/or vehicle 200), an autonomous vehicle system (e.g., an autonomous vehicle system that is the same as or similar to remote AV system 114, a fleet management system (e.g., a fleet management system that is the same as or similar to fleet management system 116 of FIG. 1, a V2I system (e.g., a V2I system that is the same as or similar to V2I system 118 of FIG. 1) and/or the like.

Figure 4B:
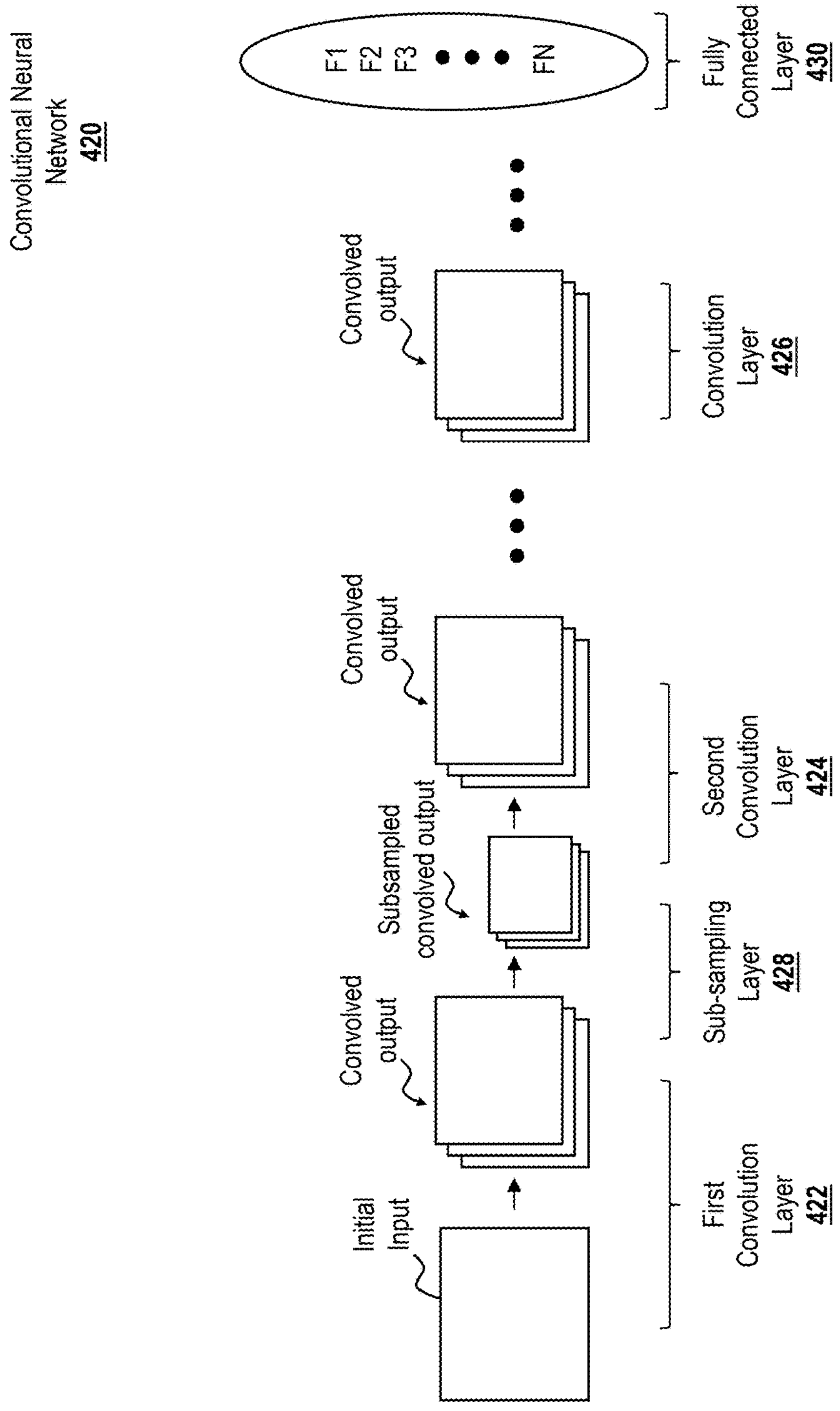
FIG. 4B is a diagram of an implementation of a neural network.

Referring now to FIG. 4B, illustrated is a diagram of an implementation of a machine learning model. More specifically, illustrated is a diagram of an implementation of a convolutional neural network (CNN) 420. For purposes of illustration, the following description of CNN 420 will be with respect to an implementation of CNN 420 by perception system 402. However, it will be understood that in some examples CNN 420 (e.g., one or more components of CNN 420) is implemented by other systems different from, or in addition to, perception system 402 such as planning system 404, localization system 406, and/or control system 408. While CNN 420 includes certain features as described herein, these features are provided for the purpose of illustration and are not intended to limit the present disclosure.

CNN 420 includes a plurality of convolution layers including first convolution layer 422, second convolution layer 424, and convolution layer 426. In some embodiments, CNN 420 includes sub-sampling layer 428 (sometimes referred to as a pooling layer). In some embodiments, sub-sampling layer 428 and/or other subsampling layers have a dimension (i.e., an amount of nodes) that is less than a dimension of an upstream system. By virtue of sub-sampling layer 428 having a dimension that is less than a dimension of an upstream layer, CNN 420 consolidates the amount of data associated with the initial input and/or the output of an upstream layer to thereby decrease the amount of computations necessary for CNN 420 to perform downstream convolution operations. Additionally, or alternatively, by virtue of sub-sampling layer 428 being associated with (e.g., configured to perform) at least one subsampling function (as described below with respect to FIGS. 4C and 4D), CNN 420 consolidates the amount of data associated with the initial input.

Perception system 402 performs convolution operations based on perception system 402 providing respective inputs and/or outputs associated with each of first convolution layer 422, second convolution layer 424, and convolution layer 426 to generate respective outputs. In some examples, perception system 402 implements CNN 420 based on perception system 402 providing data as input to first convolution layer 422, second convolution layer 424, and convolution layer 426. In such an example, perception system 402 provides the data as input to first convolution layer 422, second convolution layer 424, and convolution layer 426 based on perception system 402 receiving data from one or more different systems (e.g., one or more systems of a vehicle that is the same as or similar to vehicle 102), a remote AV system that is the same as or similar to remote AV system 114, a fleet management system that is the same as or similar to fleet management system 116, a V2I system that is the same as or similar to V2I system 118, and/or the like). A detailed description of convolution operations is included below with respect to FIG. 4C.

In some embodiments, perception system 402 provides data associated with an input (referred to as an initial input) to first convolution layer 422 and perception system 402 generates data associated with an output using first convolution layer 422. In some embodiments, perception system 402 provides an output generated by a convolution layer as input to a different convolution layer. For example, perception system 402 provides the output of first convolution layer 422 as input to sub-sampling layer 428, second convolution layer 424, and/or convolution layer 426. In such an example, first convolution layer 422 is referred to as an upstream layer and sub-sampling layer 428, second convolution layer 424, and/or convolution layer 426 are referred to as downstream layers. Similarly, in some embodiments perception system 402 provides the output of sub-sampling layer 428 to second convolution layer 424 and/or convolution layer 426 and, in this example, sub-sampling layer 428 would be referred to as an upstream layer and second convolution layer 424 and/or convolution layer 426 would be referred to as downstream layers.

In some embodiments, perception system 402 processes the data associated with the input provided to CNN 420 before perception system 402 provides the input to CNN 420. For example, perception system 402 processes the data associated with the input provided to CNN 420 based on perception system 402 normalizing sensor data (e.g., image data, LiDAR data, radar data, and/or the like).

In some embodiments, CNN 420 generates an output based on perception system 402 performing convolution operations associated with each convolution layer. In some examples, CNN 420 generates an output based on perception system 402 performing convolution operations associated with each convolution layer and an initial input. In some embodiments, perception system 402 generates the output and provides the output as fully connected layer 430. In some examples, perception system 402 provides the output of convolution layer 426 as fully connected layer 430, where fully connected layer 430 includes data associated with a plurality of feature values referred to as F1, F2 . . . FN. In this example, the output of convolution layer 426 includes data associated with a plurality of output feature values that represent a prediction.

In some embodiments, perception system 402 identifies a prediction from among a plurality of predictions based on perception system 402 identifying a feature value that is associated with the highest likelihood of being the correct prediction from among the plurality of predictions. For example, where fully connected layer 430 includes feature values F1, F2, . . . FN, and F1 is the greatest feature value, perception system 402 identifies the prediction associated with F1 as being the correct prediction from among the plurality of predictions. In some embodiments, perception system 402 trains CNN 420 to generate the prediction. In some examples, perception system 402 trains CNN 420 to generate the prediction based on perception system 402 providing training data associated with the prediction to CNN 420.

Figure 4C:
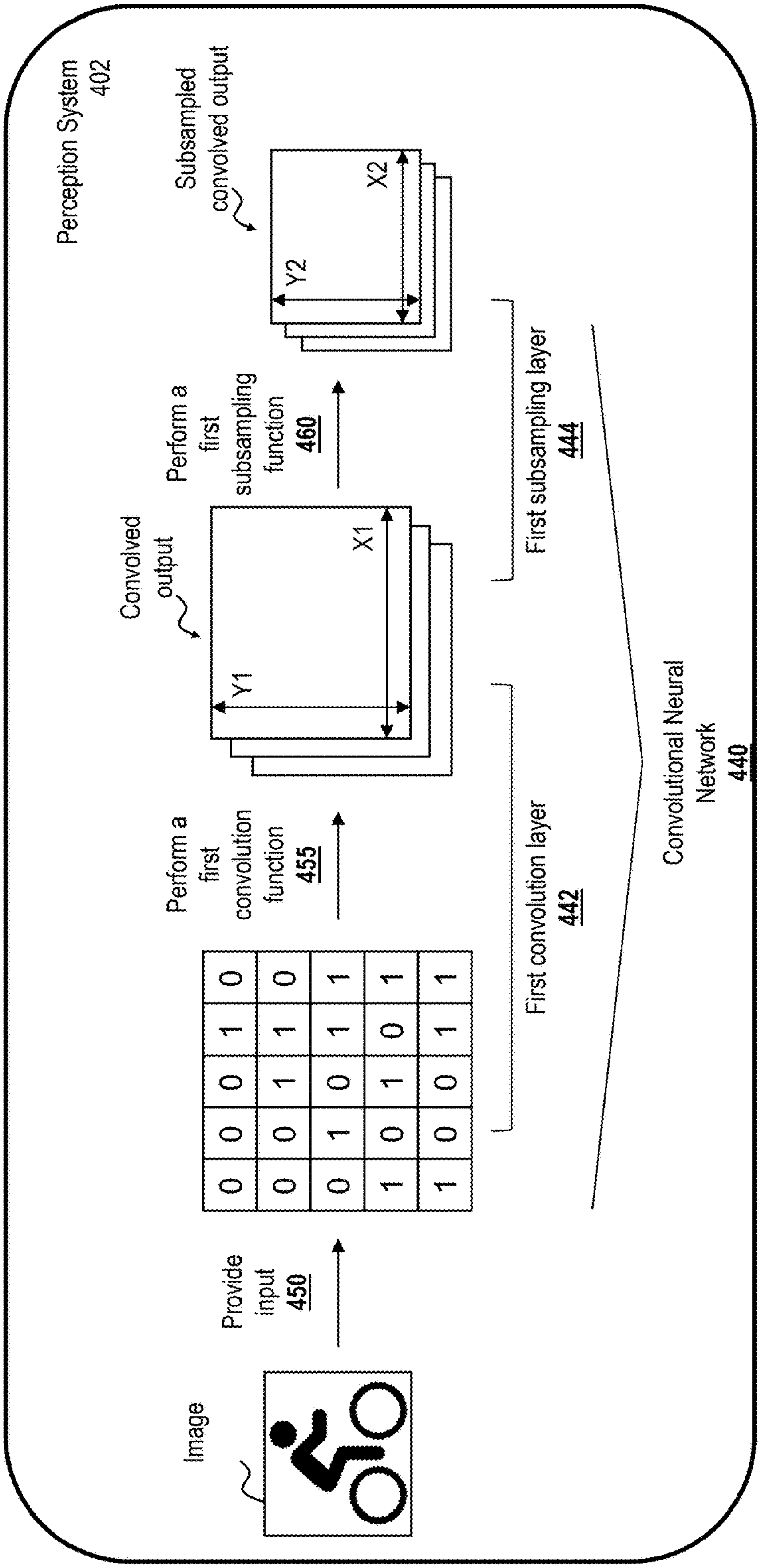
FIGS. 4C and 4D are a diagram illustrating example operation of a CNN.
Figure 4D:
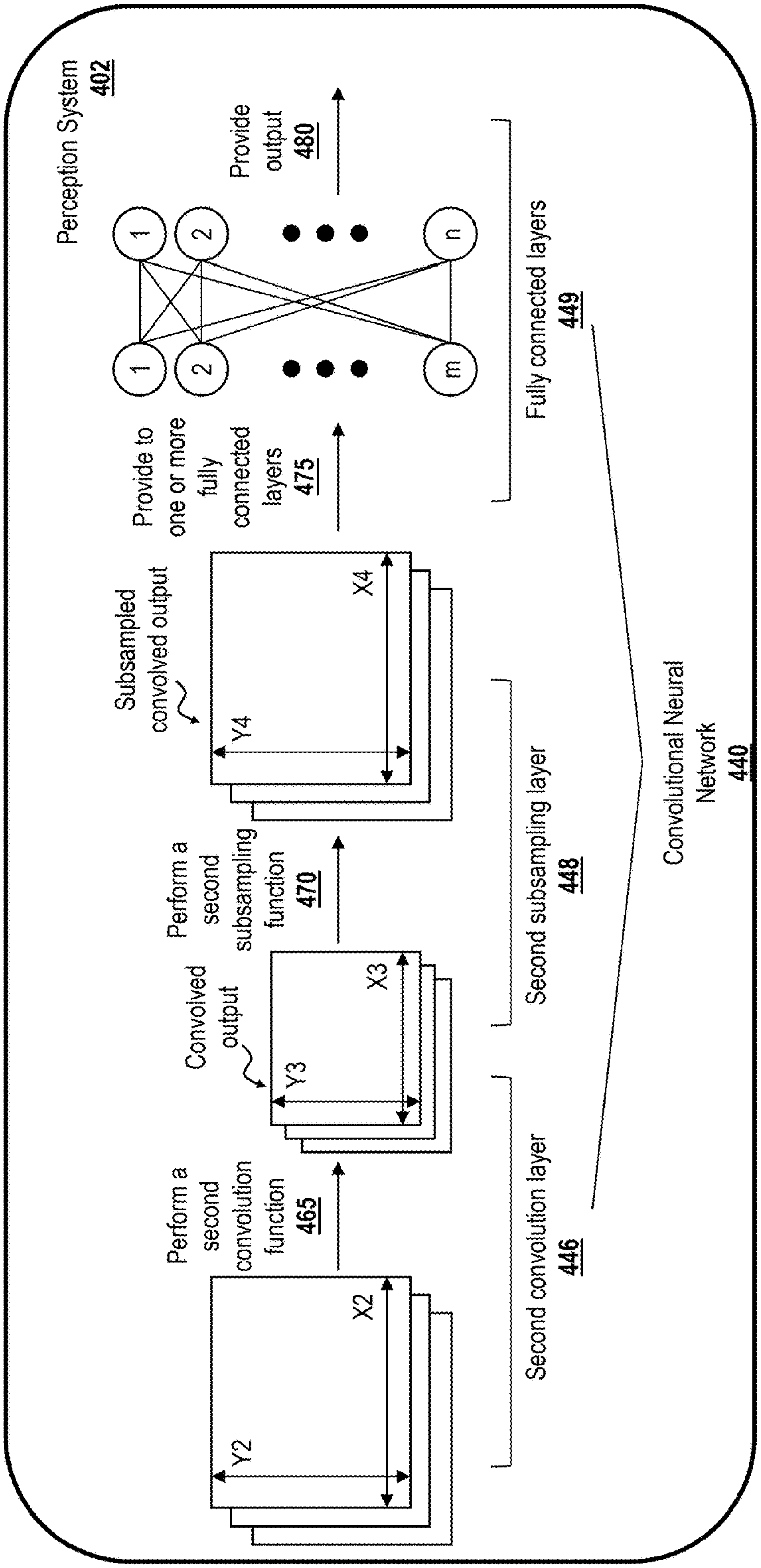

Referring now to FIGS. 4C and 4D, illustrated is a diagram of example operation of CNN 440 by perception system 402. In some embodiments, CNN 440 (e.g., one or more components of CNN 440) is the same as, or similar to, CNN 420 (e.g., one or more components of CNN 420) (see FIG. 4B).

At step 450, perception system 402 provides data associated with an image as input to CNN 440 (step 450). For example, as illustrated, perception system 402 provides the data associated with the image to CNN 440, where the image is a greyscale image represented as values stored in a two-dimensional (2D) array. In some embodiments, the data associated with the image may include data associated with a color image, the color image represented as values stored in a three-dimensional (3D) array. Additionally, or alternatively, the data associated with the image may include data associated with an infrared image, a radar image, and/or the like.

At step 455, CNN 440 performs a first convolution function. For example, CNN 440 performs the first convolution function based on CNN 440 providing the values representing the image as input to one or more neurons (not explicitly illustrated) included in first convolution layer 442. In this example, the values representing the image can correspond to values representing a region of the image (sometimes referred to as a receptive field). In some embodiments, each neuron is associated with a filter (not explicitly illustrated). A filter (sometimes referred to as a kernel) is representable as an array of values that corresponds in size to the values provided as input to the neuron. In one example, a filter may be configured to identify edges (e.g., horizontal lines, vertical lines, straight lines, and/or the like). In successive convolution layers, the filters associated with neurons may be configured to identify successively more complex patterns (e.g., arcs, objects, and/or the like).

In some embodiments, CNN 440 performs the first convolution function based on CNN 440 multiplying the values provided as input to each of the one or more neurons included in first convolution layer 442 with the values of the filter that corresponds to each of the one or more neurons. For example, CNN 440 can multiply the values provided as input to each of the one or more neurons included in first convolution layer 442 with the values of the filter that corresponds to each of the one or more neurons to generate a single value or an array of values as an output. In some embodiments, the collective output of the neurons of first convolution layer 442 is referred to as a convolved output. In some embodiments, where each neuron has the same filter, the convolved output is referred to as a feature map.

In some embodiments, CNN 440 provides the outputs of each neuron of first convolutional layer 442 to neurons of a downstream layer. For purposes of clarity, an upstream layer can be a layer that transmits data to a different layer (referred to as a downstream layer). For example, CNN 440 can provide the outputs of each neuron of first convolutional layer 442 to corresponding neurons of a subsampling layer. In an example, CNN 440 provides the outputs of each neuron of first convolutional layer 442 to corresponding neurons of first subsampling layer 444. In some embodiments, CNN 440 adds a bias value to the aggregates of all the values provided to each neuron of the downstream layer. For example, CNN 440 adds a bias value to the aggregates of all the values provided to each neuron of first subsampling layer 444. In such an example, CNN 440 determines a final value to provide to each neuron of first subsampling layer 444 based on the aggregates of all the values provided to each neuron and an activation function associated with each neuron of first subsampling layer 444.

At step 460, CNN 440 performs a first subsampling function. For example, CNN 440 can perform a first subsampling function based on CNN 440 providing the values output by first convolution layer 442 to corresponding neurons of first subsampling layer 444. In some embodiments, CNN 440 performs the first subsampling function based on an aggregation function. In an example, CNN 440 performs the first subsampling function based on CNN 440 determining the maximum input among the values provided to a given neuron (referred to as a max pooling function). In another example, CNN 440 performs the first subsampling function based on CNN 440 determining the average input among the values provided to a given neuron (referred to as an average pooling function). In some embodiments, CNN 440 generates an output based on CNN 440 providing the values to each neuron of first subsampling layer 444, the output sometimes referred to as a subsampled convolved output.

At step 465, CNN 440 performs a second convolution function. In some embodiments, CNN 440 performs the second convolution function in a manner similar to how CNN 440 performed the first convolution function, described above. In some embodiments, CNN 440 performs the second convolution function based on CNN 440 providing the values output by first subsampling layer 444 as input to one or more neurons (not explicitly illustrated) included in second convolution layer 446. In some embodiments, each neuron of second convolution layer 446 is associated with a filter, as described above. The filter(s) associated with second convolution layer 446 may be configured to identify more complex patterns than the filter associated with first convolution layer 442, as described above.

In some embodiments, CNN 440 performs the second convolution function based on CNN 440 multiplying the values provided as input to each of the one or more neurons included in second convolution layer 446 with the values of the filter that corresponds to each of the one or more neurons. For example, CNN 440 can multiply the values provided as input to each of the one or more neurons included in second convolution layer 446 with the values of the filter that corresponds to each of the one or more neurons to generate a single value or an array of values as an output.

In some embodiments, CNN 440 provides the outputs of each neuron of second convolutional layer 446 to neurons of a downstream layer. For example, CNN 440 can provide the outputs of each neuron of first convolutional layer 442 to corresponding neurons of a subsampling layer. In an example, CNN 440 provides the outputs of each neuron of first convolutional layer 442 to corresponding neurons of second subsampling layer 448. In some embodiments, CNN 440 adds a bias value to the aggregates of all the values provided to each neuron of the downstream layer. For example, CNN 440 adds a bias value to the aggregates of all the values provided to each neuron of second subsampling layer 448. In such an example, CNN 440 determines a final value to provide to each neuron of second subsampling layer 448 based on the aggregates of all the values provided to each neuron and an activation function associated with each neuron of second subsampling layer 448.

At step 470, CNN 440 performs a second subsampling function. For example, CNN 440 can perform a second subsampling function based on CNN 440 providing the values output by second convolution layer 446 to corresponding neurons of second subsampling layer 448. In some embodiments, CNN 440 performs the second subsampling function based on CNN 440 using an aggregation function. In an example, CNN 440 performs the first subsampling function based on CNN 440 determining the maximum input or an average input among the values provided to a given neuron, as described above. In some embodiments, CNN 440 generates an output based on CNN 440 providing the values to each neuron of second subsampling layer 448.

At step 475, CNN 440 provides the output of each neuron of second subsampling layer 448 to fully connected layers 449. For example, CNN 440 provides the output of each neuron of second subsampling layer 448 to fully connected layers 449 to cause fully connected layers 449 to generate an output. In some embodiments, fully connected layers 449 are configured to generate an output associated with a prediction (sometimes referred to as a classification). The prediction may include an indication that an object included in the image provided as input to CNN 440 includes an object, a set of objects, and/or the like. In some embodiments, perception system 402 performs one or more operations and/or provides the data associated with the prediction to a different system, described herein.

Figure 5A:
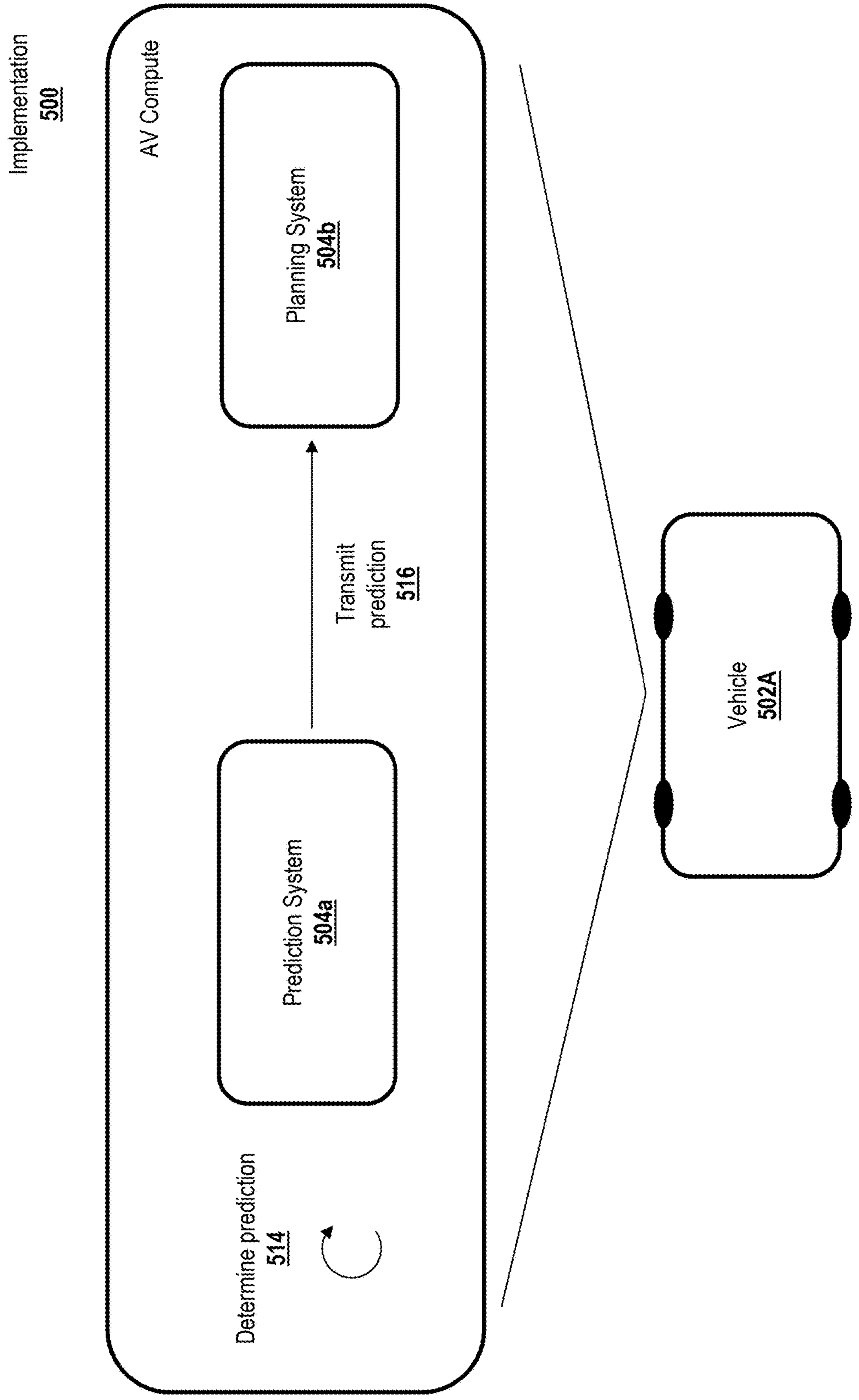
FIGS. 5A-5B are diagrams of an implementation of a process for pre-training machine learning models with contrastive learning.

FIG. 5A is a block diagram of an implementation 500A according to the present techniques. The some embodiments, implementation 500A is implemented (e.g., completely, partially, etc.) using an autonomous system that is the same as or similar to autonomous system 202, described in reference to FIG. 2. In some embodiments, one or more of the steps of implementation 500A are performed (e.g., completely, partially, and/or the like) by another device or system, or another group of devices and/or systems that are separate from, or include, the autonomous system. For example, one or more steps of implementation 500A can be performed (e.g., completely, partially, and/or the like) by remote AV system 114, vehicle 102 (e.g., autonomous system 202 of vehicle 102 or 200), device 300 of FIG. 3, and/or AV compute 400 (e.g., one or more systems of AV compute 400 of FIG. 4A). In some embodiments, the steps of implementation 500 may be performed between any of the above-noted systems in cooperation with one another.

As shown in FIG. 5A, a prediction system 504*a* determines one or more predictions 514. In examples, the prediction system 504*a* predicts an actor's (e.g., an other vehicle, object, etc. in the environment) future trajectory. The predictions are transmitted (516) to a planning system 504*b* (e.g., planning system 404 of FIG. 4). In some embodiments, the prediction system 504*a* makes predictions using one or more prediction models. In examples, the prediction models are object detection models, segmentation models, and the like. For example, the prediction system is any of the following: You Only Look Once (YOLO), Region-based Convolutional Neural Network (RCNN), Mask RCNN, Single Shot Detector (SSD), Faster R-CNN, RetinaNet, U-Net, or DeepLab. The YOLO model detects and classify multiple objects in real-time. RCNN uses a selective search to identify regions of interest and then uses convolutional neural networks to classify objects. Mask RCNN is extension of RCNN that includes segmentation information for each detected object. SSD is an object detection model that detects objects in real-time. Faster R-CNN is a faster version of RCNN that uses a region proposal network to generate region proposals. RetinaNet is a single-stage object detection model that uses a focal loss function to improve performance on imbalanced datasets. U-Net is a segmentation model that uses a contracting path to capture context and a symmetric expanding path to get precise localization. DeepLab is a semantic segmentation model used for semantic segmentation, that uses atrous convolutions (e.g., convolving the input with a set of upsampled filters, produced by inserting rate—1 zeros between two consecutive values of the filters along the height and width dimensions) to capture multi-scale context. In some embodiments, the prediction models are trained in a two-stage training process as described with respect to FIGS. 6A and 6B below.

Figure 5B:
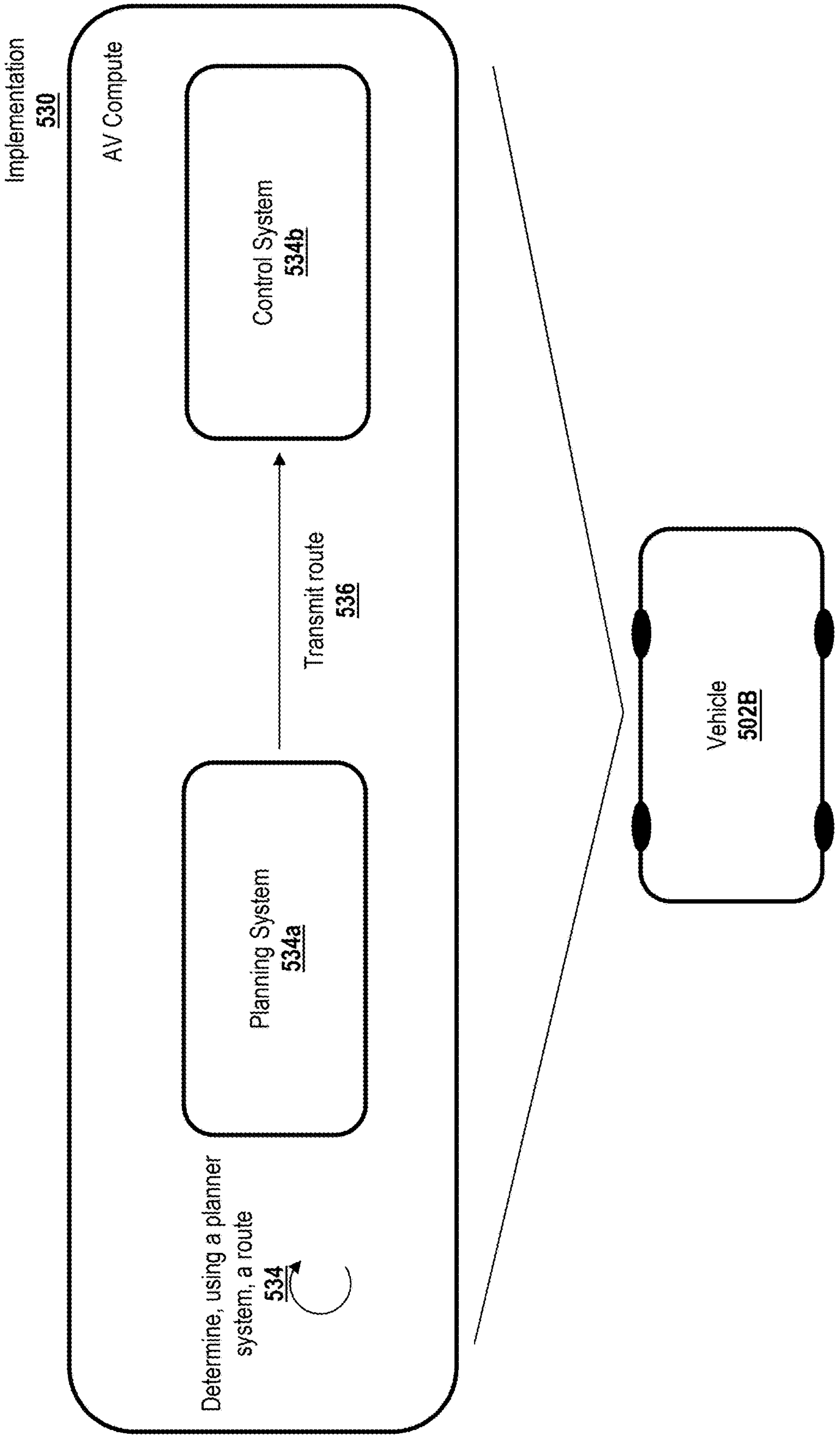

FIG. 5B is a block diagram of an implementation 500B according to the present techniques. The some embodiments, implementation 500B is implemented (e.g., completely, partially, etc.) using an autonomous system that is the same as or similar to autonomous system 202, described in reference to FIG. 2. In some embodiments, one or more of the steps of implementation 500B are performed (e.g., completely, partially, and/or the like) by another device or system, or another group of devices and/or systems that are separate from, or include, the autonomous system. For example, one or more steps of implementation 500B can be performed (e.g., completely, partially, and/or the like) by remote AV system 114, vehicle 102 (e.g., autonomous system 202 of vehicle 102 or 200), device 300 of FIG. 3, and/or AV compute 400 (e.g., one or more systems of AV compute 400 of FIG. 4A). In some embodiments, the steps of implementation 500 may be performed between any of the above-noted systems in cooperation with one another.

As shown in FIG. 5A, a planning system 534*a* (e.g., planning system 404 of FIG. 4) outputs one or more routes 534. The routes are transmitted (536) to a control system 534*b*. In some embodiments, the planning system determines routes based on trajectories output using one or more machine learning models. In examples, the machine learning models are path prediction models. For example, the planning system includes any of the following: a Graph Convolutional Network (GCN), Graph Attention Network (GAT), Message Passing Neural Network (MPNN), Temporal Graph Networks (TGN), Probablistic Roadmap (PRM), Rapidly Exploring Random Tree (RRT), Model Predictive Control (MPC), Behavior trees, Hybrid A* Search, Dynamic Window, and Artificial Potential Fields.

A GCN is an approach for semi-supervised learning on graph-structured data, and operates directly on graphs. In a GCN, the numbers of nodes connections vary and the nodes are unordered (irregular on non-Euclidean structured data). A GAT is a neural network architecture that operates on graph-structured data, leveraging masked self-attentional layers to address the shortcomings of prior methods based on graph convolutions or their approximations. By stacking layers in which nodes are able to attend over their neighborhoods' features, a GAT enables (implicitly) specifying different weights to different nodes in a neighborhood, without requiring any kind of costly matrix operation (such as inversion) or depending on knowing the graph structure upfront.

A MPNN propagates node features by exchanging information between adjacent nodes. A typical MPNN architecture has several propagation layers, where each node is updated based on the aggregation of its neighbors' features. A TGN generalizes MPNNs to temporal graphs by introducing a node memory which represents the state of the node at a given time, acting as a compressed representation of the node's past interactions. A PRM generates a roadmap of the environment, and uses probabilistic sampling to plan a path between the starting point and the destination. An RRT generates a tree of possible paths in the environment, and uses a probabilistic strategy to select the best path. An MPC uses a predictive model of the vehicle's dynamics to plan a sequence of actions that minimize a cost function. This model can be used for real-time control of the vehicle. Behavior Trees use a hierarchical structure of behaviors to plan a sequence of actions based on the current situation. This model is useful for planning in dynamic environments. The Hybrid A* Search combines discrete and continuous planning to generate a path. The Dynamic Window Approach uses a local search to find the optimal path to a goal within a limited time horizon. This model is useful for real-time planning in dynamic environments. Artificial Potential Fields generate a virtual force field around obstacles, and uses this field to plan a path that avoids collisions. This model is useful for planning in cluttered environments. In some embodiments, the models described above are trained in a two-stage training process as described with respect to FIGS. 6A and 6B below.

Figure 6A:
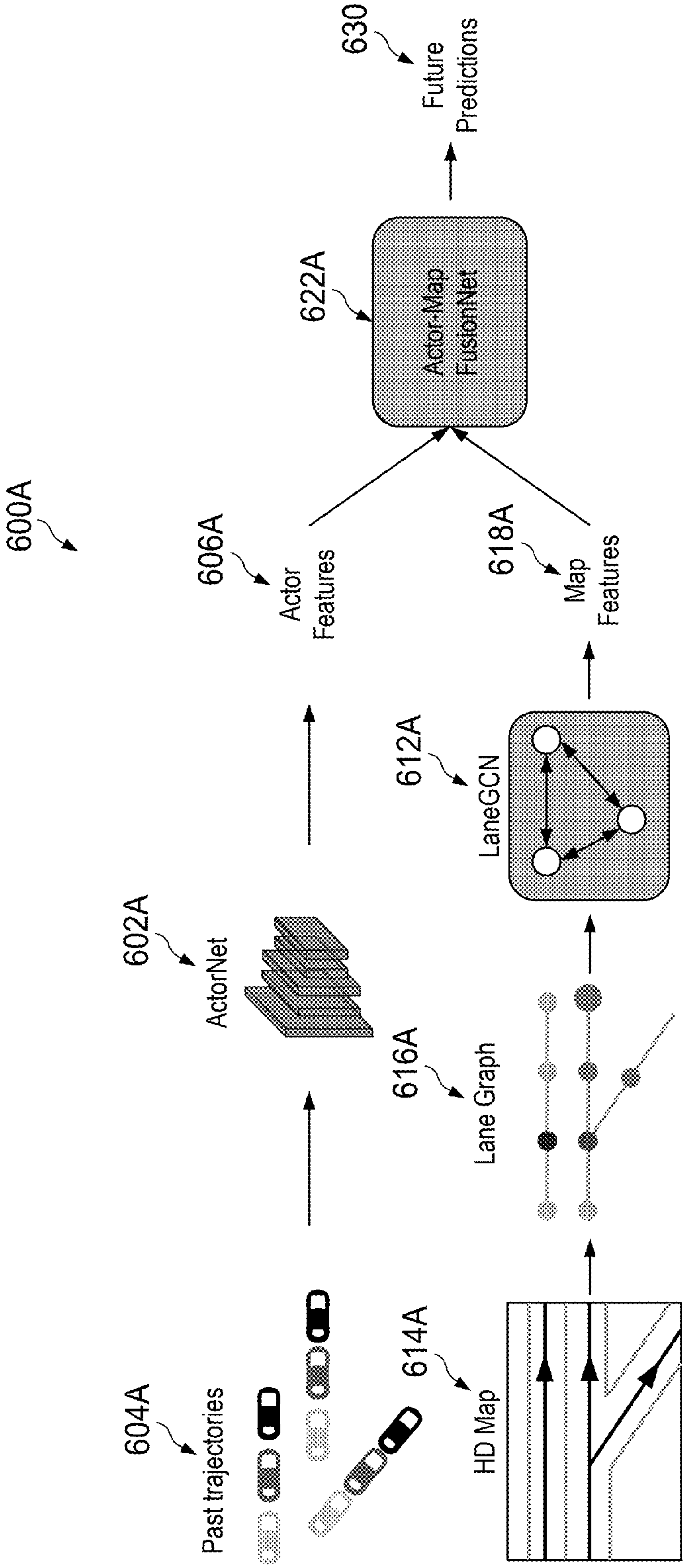
FIGS. 6A and 6B show pre-training and training of a machine learning model.
Figure 6B:
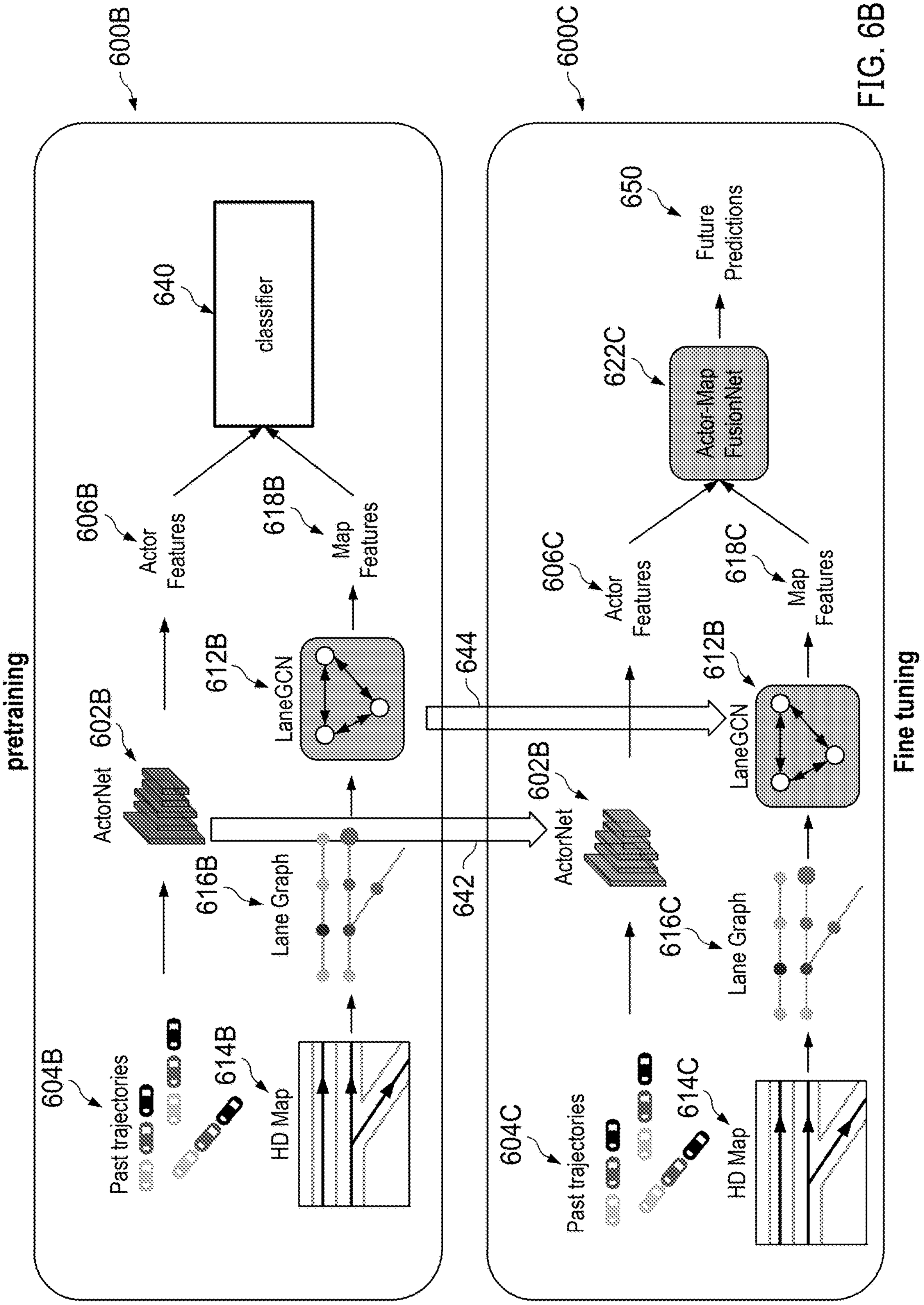

FIGS. 6A and 6B show pre-training and training of a machine learning model according to the present techniques. The some embodiments, the model 600A, pre-trained model 600B, and fine-tuned model 600C are implemented (e.g., completely, partially, etc.) using an autonomous system that is the same as or similar to autonomous system 202, described in reference to FIG. 2. In some embodiments, the model 600A, pre-trained model 600B, and fine-tuned model 600C are trained or executed (e.g., completely, partially, and/or the like) by another device or system, or another group of devices and/or systems that are separate from, or include, the autonomous system. For example, the model 600A, pre-trained model 600B, and fine-tuned model 600C can be trained or executed (e.g., completely, partially, and/or the like) by remote AV system 114, vehicle 102 (e.g., autonomous system 202 of vehicle 102 or 200), device 300 of FIG. 3, and/or AV compute 400 (e.g., one or more systems of AV compute 400 of FIG. 4A). In some embodiments, the training or execution of the model 600A, pre-trained model 600B, and fine-tuned model 600C between any of the above-noted systems in cooperation with one another. In FIGS. 6A and 6B, a particular machine learning model is used for purposes of explanation. However, any machine learning model can be used as described herein.

Training machine learning models, such as prediction models or planning models, is a process where values are determined for weights and biases used during execution of the model. For example, a machine learning algorithm builds a model by examining many examples and attempting to find a model that minimizes loss. The machine learning models are trained using a training dataset. Training datasets are often updated with new, unseen data. The trained machine learning models are then trained again using the available training data, including the previous data used for training the machine learning models as well as the new, unseen data. Training machine learning models in this manner can be costly and time consuming due to constant progress and the frequent availability of new, unseen data.

The present techniques using pre-training to generate an intermediate machine learning model. The intermediate machine learning model leverages the available datasets and learns high level features in the available datasets without end-to-end training or retraining of a complete machine learning model. The intermediate, pre-trained machine learning model is derived from portions of the complete machine learning model. In some embodiments, the intermediate, pre-trained machine learning model is iteratively updated as additional training datasets become available.

In the example of FIG. 6A, a complete graph convolutional network (GCN) model 600A includes an actor network 602A, a lane graph convolutional network (GCN) 612A, and a fusion network 622A. In examples, the GCN model 600A includes components that perform tasks such as trajectory information encoding, map information encoding, information fusion, and trajectory prediction. In examples, the GCN model 600A uses neural networks to encode/extract information. Accordingly, each of the trajectory information encoding and map information encoding components rely on a respective neural network to extract features.

In the GCN model 600A, past trajectories 604A are input to the actor network 602A, and the actor network 602A outputs actor features 606A. The past trajectories 604A are, for example, a sequence of displacements at a series of time steps. In examples, the actor network includes a one dimensional (1D) CNN or RNN that extracts multiscale features associated with respective actors at a series of time stamps. In examples, the actor network 602A includes a feature pyramid network that fuses the multiscale features, and a residual block is applied to the fused multiscale features to obtain the output actor features 606A.

The GCN model 600A obtains an HD map 614A, and a lane graph 616A is extracted from the HD map 614A. In a lane graph representation, each lane contains a centerline (e.g., a sequence of 2D BEV points, which are arranged following the lane direction). Segments of real world lanes are represented as nodes, where the location of a lane node is the averaged coordinates of its two end points. The lane graph 616A is input to the lane GCN 612A. In some examples, the lane GCN 612A extends graph convolutions with multiple adjacency matrices and along lane dilation. The lane GCN 612A includes multi-scale residual blocks, each of which consists of a convolutions and a linear layer with a residual connection. The output of the LaneGCN is map features 618A.

Actor-Map Fusion network 622A fuses the actor features 606A and map features 618A. The behavior of an actor strongly depends on its context (e.g., other actors and the map). In some embodiments, multiple fusion blocks are used to capture interactions between actor features 606A and map features 618A, e.g., actors to lanes, lanes to lanes, lanes to actors, and actors to actors. In some embodiments, the future predictions 630 are generated by inputting the fused actor-map features to a multi-modal prediction header. The multi modal prediction header outputs a final motion forecasting. In examples, the final motion forecasting is a prediction or one or more possible future trajectories and a confidence score for each actor.

Training the complete lane GCN model 600A as a whole (e.g., parameters learned through end-to-end training all components of the model) to output the final motion forecasting can be time consuming. In some embodiments, components of the model are trained to perform an alternative task. By training components of the model to perform the alternative task, the components are pre-trained with respect to the primary task. In the example of FIG. 6A, training of the complete GCN model 600A is performed so that the model 600A will output future predictions 630 as the primary task.

FIG. 6B shows components of a complete machine learning model pre-trained to perform an alternative task (model 600B), and fine tuning of the complete machine learning model including the pre-trained components (model 600C). In the example of FIG. 6B, the alternative task is a classification task. In some embodiments, contrastive learning is used to train the components. Contrastive learning includes, for example, data augmentation, encoding, and loss minimization.

Figure 7:
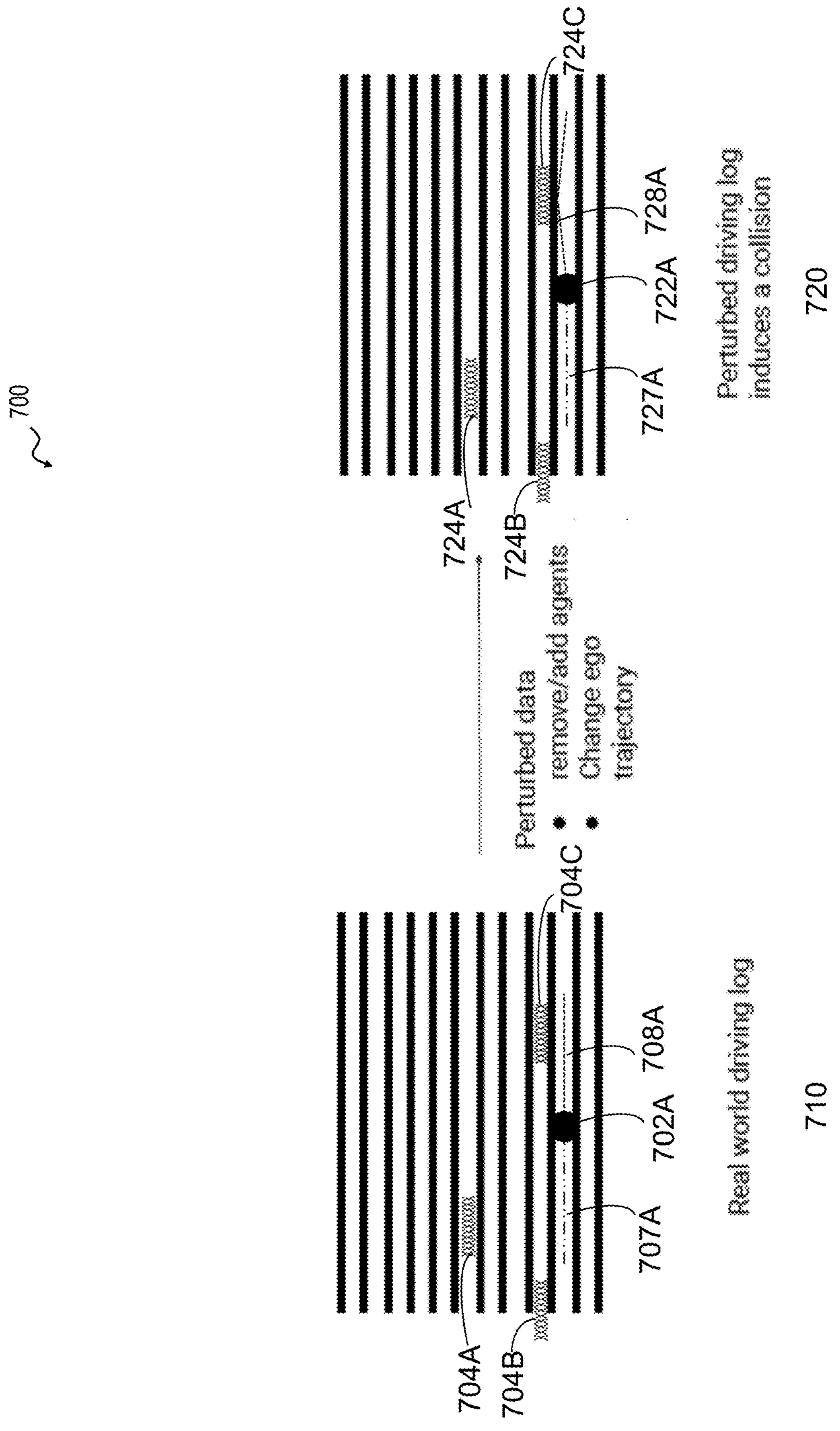
FIG. 7 shows data augmentation according to the present techniques.

FIG. 7 shows data augmentation according to the present techniques. In examples, the training data 700 used when training the components includes a real data 710 and perturbed data 720. In the example of FIG. 7, the real data includes a real world driving log. In examples, the real world driving log is obtained from data recordings captured from one or more sensors, devices, or systems of an autonomous vehicle as the vehicle navigates through the environment. For purposes of illustration, the real data is shown as a bird's eye view image of the environment including an autonomous vehicle 702A (e.g., ego vehicle) and actor trajectories 704A, 704B, and 704C located in lanes of travel in the environment. The past trajectory 707A and future trajectory 708A of the autonomous vehicle 702A is also shown in the real data 710.

To generate a training dataset to create an intermediate machine learning model, contrastive learning is applied to components of the corresponding complete machine learning model. The real data is augmented to obtain at least two representations based on the real data: real and perturbed data. The perturbed data 720 is a fake or pseudo representation of the real data 710. The perturbed data is shown as a bird's eye view image of the environment including an autonomous vehicle 722A (e.g., ego vehicle) and actor trajectories 724A, 724B, and 724C located in lanes of travel in the environment. The past trajectory 727A and future trajectory 728A of the autonomous vehicle 722A is also shown in the perturbed data 720.

In examples, the perturbed data 720 includes a modification or other augmentation to the past trajectory of the autonomous vehicle, the future trajectory of the autonomous vehicle, the trajectories of actors in the environment, the lanes in the environment, or the route of the autonomous vehicle. The perturbed data can also include, for example, the addition or removal of actors. In the example perturbed data 720, the trajectory of the autonomous vehicle 722B is augmented to induce a collision with an actor, represented by the actor trajectory 724C. The future trajectory 728A of the autonomous vehicle 722A is perturbed when compared with the original future trajectory 708A in the real data 710. The real data 710 and the perturbed data 720 establish two datasets 700 that are used to pre-train components of a machine learning model.

Referring again to FIG. 6B, the two datasets (e.g., datasets 700 of FIG. 7) are used to train components of the complete machine learning model to complete an alternative task 640. In particular the actor network 602B and the Lane GCN 612B are trained to learn high level features in the datasets. In examples, the actor network 602B and the lane GCN 612B are trained to classify the input data as real or perturbed. In examples, the past trajectories 604B, HD map 614B and lane graph 606B are obtained from the real data and perturbed data. The actor network 602B outputs actor features 606B, and the lane GCN 612B outputs map features 618B. The actor features 606B and map features 618B are input to a classifier 640. The alternative model is trained to output a classification of real or perturbed for the corresponding input data.

In examples, the pre-trained components are those components of prediction models and planning models that capture interactions between actor features 606A and/or map features, including actors to lane interactions, lanes to lanes interactions, lanes to actors interactions, and actors to actors interactions. Extracting these components and training the components on an alternative task, such as classifying the data as real or perturbed enables fast and efficient training of the components without end-to-end training of a complete model including the primary tasked (e.g., planning or prediction). The alternative task enables the components to learn high level features associated with the interactions. The components that are trained to perform the alternative task are pre-trained with respect to the primary task. In examples, the pre-trained components are aware of a meaningful representation of the data, and are saved as intermediate models that can be iteratively updated when new data is available.

The pre-trained components are inserted into the complete machine learning model that performs the primary task. As shown in FIG. 6B, the pre-trained components include the actor network 602B and the lane GCN 612B. The pre-trained actor network 602B and the lane GCN 612B are inserted into the complete machine learning model 600C that outputs future predictions as the primary task. The complete machine learning model 600C is fine-tuned by transfer learning, in which the weights of the pre-trained components are trained on new data. In examples, the past trajectories 604C, HD map 614C and lane graph 606C are obtained from new, unseen data. The actor network 602B outputs actor features 606C, and the lane GCN 612B outputs map features 618C. The actor features 606C and map features 618C are input to a classifier 640. The model 600C is trained to output a final motion prediction 650 as the primary task. By pre-training components of the complete machine learning model, the processing time for training on new datasets is reduced. Rather than training the complete machine learning model using all available data each time new data is available, the present techniques enable iterative updates to components of the model that are stored and updated as new data becomes available. The components can be connected to many different downstream tasks, making the development process much faster.

Figure 8:
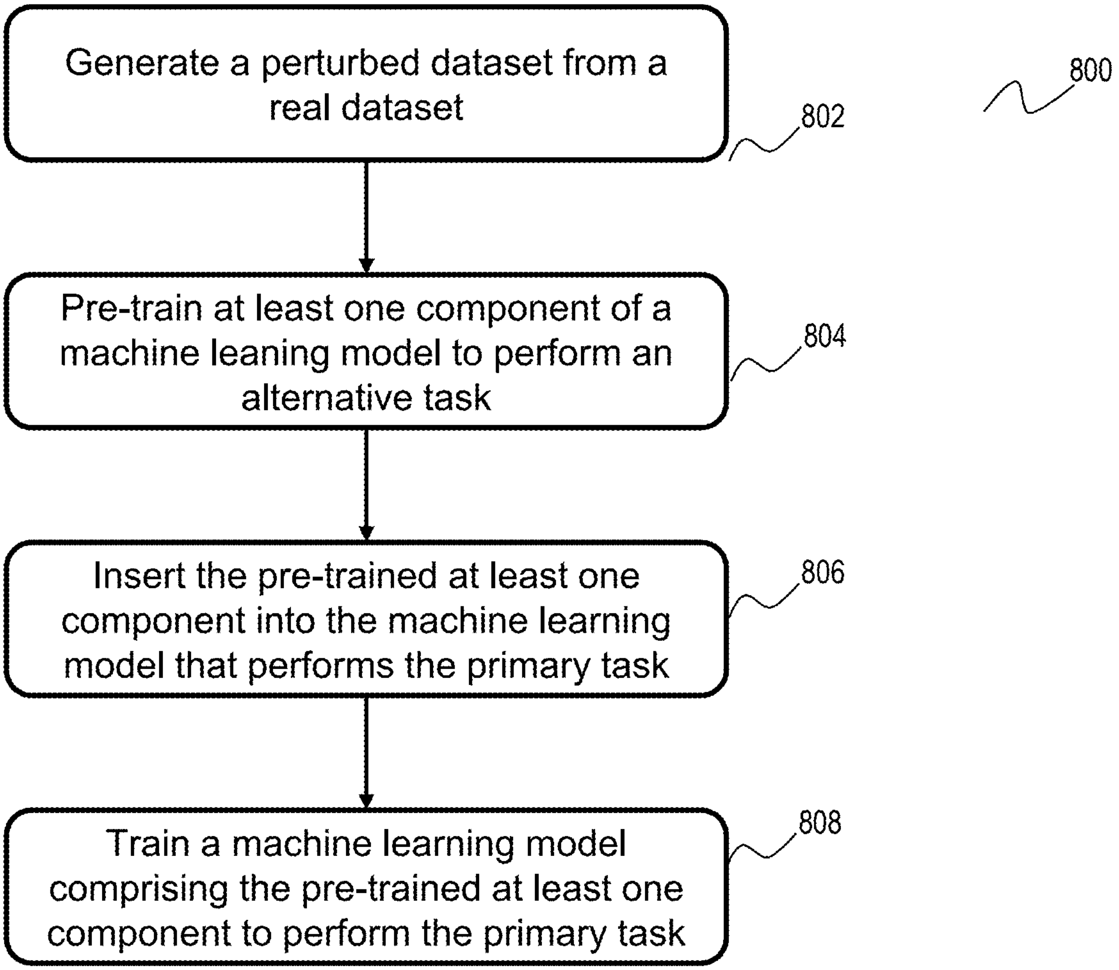
FIG. 8 is a process flow diagram a process for pre-training machine learning models with contrastive learning.

Referring now to FIG. 8, illustrated is a flowchart of a process 800 for pre-training machine learning models with contrastive learning. In some embodiments, one or more of the steps described with respect to process 800 are performed (e.g., completely, partially, and/or the like) using an autonomous system that is the same as or similar to autonomous system 202, described in reference to FIG. 2. In some embodiments, one or more of the steps of process 800 are performed (e.g., completely, partially, and/or the like) by another device or system, or another group of devices and/or systems that are separate from, or include, the autonomous system. For example, one or more steps of process 800 can be performed (e.g., completely, partially, and/or the like) by remote AV system 114, vehicle 102 (e.g., autonomous system 202 of vehicle 102 or 200), device 300 of FIG. 3, and/or AV compute 400 (e.g., one or more systems of AV compute 400 of FIG. 4A). In some embodiments, the steps of process 800 may be performed between any of the above-noted systems in cooperation with one another.

At block 802, a perturbed dataset is generated from a real dataset. The real dataset is, for example, a real world driving log. In examples, generating the perturbed dataset comprises modifying a past trajectory of an autonomous vehicle, a future trajectory of the autonomous vehicle, trajectories of actors, adding or removing lanes, adding or removing actors, or any combinations thereof.

At block 804, at least one component of a machine leaning model is pre-trained to perform an alternative task, wherein the machine learning model performs a primary task. The at least one component captures interactions between actor features and map features. Additionally, in examples the pre-trained at least one component is stored as an intermediate model that is iteratively updated when new data is available.

At block 806, the pre-trained at least one component is inserted into the machine learning model that performs the primary task.

At block 808, the machine learning model comprising the pre-trained at least one component is trained to perform the primary task.

According to some non-limiting embodiments or examples, provided is a method, including generating, with at least one processor, a perturbed dataset from a real dataset. The method includes pre-training, with the at least one processor, at least one component of a machine leaning model to perform an alternative task, wherein the machine learning model performs a primary task. The method also includes inserting, with the at least one processor, the pre-trained at least one component into the machine learning model that performs the primary task. Additionally, the method includes training, with the at least one processor, the machine learning model comprising the pre-trained at least one component to perform the primary task.

According to some non-limiting embodiments or examples, provided is system, including at least one processor, and at least one non-transitory storage media storing instructions that, when executed by the at least one processor, cause the at least one processor to generate a perturbed dataset from a real dataset. The instructions cause the at least one processor to pre-train at least one component of a machine leaning model to perform an alternative task, wherein the machine learning model performs a primary task. The instructions also cause the at least one processor to insert the pre-trained at least one component into the machine learning model that performs the primary task. Additionally, the instructions cause the at least one processor to train the machine learning model comprising the pre-trained at least one component to perform the primary task.

According to some non-limiting embodiments or examples, provided is at least one non-transitory computer-readable medium comprising one or more instructions that, when executed by at least one processor, cause the at least one processor to generate a perturbed dataset from a real dataset. The instructions cause the at least one processor to pre-train at least one component of a machine leaning model to perform an alternative task, wherein the machine learning model performs a primary task. Additionally, the instructions cause the at least one processor to insert the pre-trained at least one component into the machine learning model that performs the primary task. The instructions also cause the at least one processor to train the machine learning model comprising the pre-trained at least one component to perform the primary task.

Further non-limiting embodiments or examples are set forth in the following numbered clauses:

Clause 1: A method, including generating, with at least one processor, a perturbed dataset from a real dataset; pre-training, with the at least one processor, at least one component of a machine leaning model to perform an alternative task, wherein the machine learning model performs a primary task; inserting, with the at least one processor, the pre-trained at least one component into the machine learning model that performs the primary task; and training, with the at least one processor, the machine learning model comprising the pre-trained at least one component to perform the primary task.

Clause 2: The method of any preceding claim, wherein generating the perturbed dataset comprises modifying a past trajectory of an autonomous vehicle, a future trajectory of the autonomous vehicle, trajectories of actors, adding or removing lanes, adding or removing actors, or any combinations thereof.

Clause 3: The method of any preceding claim, wherein the real dataset is a real world driving log.

Clause 4: The method of any preceding claim, wherein the pre-trained at least one component is stored as an intermediate model that is iteratively updated when new data is available.

Clause 5: The method of any preceding claim, wherein the at least one component captures interactions between actor features and map features.

Clause 6: The method of any preceding claim, wherein the alternative task is a classification task.

Clause 7: The method of any preceding claim, wherein the primary task is a planning task or a prediction task.

Clause 8: A system, including at least one processor, and at least one non-transitory storage media storing instructions that, when executed by the at least one processor, cause the at least one processor to generate a perturbed dataset from a real dataset; pre-train at least one component of a machine leaning model to perform an alternative task, wherein the machine learning model performs a primary task; insert the pre-trained at least one component into the machine learning model that performs the primary task; and train the machine learning model comprising the pre-trained at least one component to perform the primary task.

Clause 9: The system of any preceding claim, wherein generating the perturbed dataset comprises modifying a past trajectory of an autonomous vehicle, a future trajectory of the autonomous vehicle, trajectories of actors, adding or removing lanes, adding or removing actors, or any combinations thereof.

Clause 10: The system of any preceding claim, wherein the real dataset is a real world driving log.

Clause 11: The system of any preceding claim, wherein the pre-trained at least one component is stored as an intermediate model that is iteratively updated when new data is available.

Clause 12: The system of any preceding claim, wherein the at least one component captures interactions between actor features and map features.

Clause 13: The system of any preceding claim, wherein the alternative task is a classification task.

Clause 14: The system of any preceding claim, wherein the primary task is a planning task or a prediction task.

Clause 15: At least one non-transitory storage media storing instructions that, when executed by at least one processor, cause the at least one processor to: generate a perturbed dataset from a real dataset; pre-train at least one component of a machine leaning model to perform an alternative task, wherein the machine learning model performs a primary task; insert the pre-trained at least one component into the machine learning model that performs the primary task; and train the machine learning model comprising the pre-trained at least one component to perform the primary task.

Clause 16: The at least one non-transitory storage media of any preceding claim, wherein generating the perturbed dataset comprises modifying a past trajectory of an autonomous vehicle, a future trajectory of the autonomous vehicle, trajectories of actors, adding or removing lanes, adding or removing actors, or any combinations thereof.

Clause 17: The at least one non-transitory storage media of any preceding claim, wherein the real dataset is a real world driving log.

Clause 18: The at least one non-transitory storage media of any preceding claim, wherein the pre-trained at least one component is stored as an intermediate model that is iteratively updated when new data is available.

Clause 19: The at least one non-transitory storage media of any preceding claim, wherein the at least one component captures interactions between actor features and map features.

Clause 20: The at least one non-transitory storage media of any preceding claim, wherein the alternative task is a classification task.

In the foregoing description, aspects and embodiments of the present disclosure have been described with reference to numerous specific details that can vary from implementation to implementation. Accordingly, the description and drawings are to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

What is claimed is:

1. A method, comprising:

generating, with at least one processor, a perturbed dataset from a real dataset, wherein the perturbed dataset is generated by augmenting the real dataset to include collisions or trajectories not present in the real dataset;

pre-training, with the at least one processor, at least one component of a machine leaning model to perform an alternative task, wherein the machine learning model performs a primary task, wherein the alterative task comprises classifying input data from the real dataset and the perturbed dataset as real or perturbed;

inserting, with the at least one processor, the pre-trained at least one component into the machine learning model that performs the primary task; and training, with the at least one processor, the machine learning model comprising the pre-trained at least one component to perform the primary task.

2. The method of claim 1, wherein generating the perturbed dataset comprises modifying a past trajectory of an autonomous vehicle, a future trajectory of the autonomous vehicle, trajectories of actors, adding or removing lanes, adding or removing actors, or any combinations thereof.

3. The method of claim 1, wherein the real dataset is a real world driving log.

4. The method of claim 1, wherein the pre-trained at least one component is stored as an intermediate model that is iteratively updated when new data is available.

5. The method of claim 1, wherein the at least one component captures interactions between actor features and map features.

6. The method of claim 1, wherein the alternative task is a classification task.

7. The method of claim 1, wherein the primary task is a planning task or a prediction task.

8. A system, comprising:

at least one processor, and at least one non-transitory storage media storing instructions that, when executed by the at least one processor, cause the at least one processor to:

generate a perturbed dataset from a real dataset, wherein the perturbed dataset is generated by augmenting the real dataset to include collisions or trajectories not present in the real dataset;

pre-train at least one component of a machine leaning model to perform an alternative task, wherein the machine learning model performs a primary task, wherein the alterative task comprises classifying input data from the real dataset and the perturbed dataset as real or perturbed;

insert the pre-trained at least one component into the machine learning model that performs the primary task; and train the machine learning model comprising the pre-trained at least one component to perform the primary task.

9. The system of claim 8, wherein generating the perturbed dataset comprises modifying a past trajectory of an autonomous vehicle, a future trajectory of the autonomous vehicle, trajectories of actors, adding or removing lanes, adding or removing actors, or any combinations thereof.

10. The system of claim 8, wherein the real dataset is a real world driving log.

11. The system of claim 8, wherein the pre-trained at least one component is stored as an intermediate model that is iteratively updated when new data is available.

12. The system of claim 8, wherein the at least one component captures interactions between actor features and map features.

13. The system of claim 8, wherein the alternative task is a classification task.

14. The system of claim 8, wherein the primary task is a planning task or a prediction task.

15. At least one non-transitory storage media storing instructions that, when executed by at least one processor, cause the at least one processor to:

generate a perturbed dataset from a real dataset, wherein the perturbed dataset is generated by augmenting the real dataset to include collisions or trajectories not present in the real dataset;

pre-train at least one component of a machine leaning model to perform an alternative task, wherein the machine learning model performs a primary task, wherein the alterative task comprises classifying input data from the real dataset and the perturbed dataset as real or perturbed;

insert the pre-trained at least one component into the machine learning model that performs the primary task; and train the machine learning model comprising the pre-trained at least one component to perform the primary task.

16. The at least one non-transitory storage media of claim 15, wherein generating the perturbed dataset comprises modifying a past trajectory of an autonomous vehicle, a future trajectory of the autonomous vehicle, trajectories of actors, adding or removing lanes, adding or removing actors, or any combinations thereof.

17. The at least one non-transitory storage media of claim 15, wherein the real dataset is a real world driving log.

18. The at least one non-transitory storage media of claim 15, wherein the pre-trained at least one component is stored as an intermediate model that is iteratively updated when new data is available.

19. The at least one non-transitory storage media of claim 15, wherein the at least one component captures interactions between actor features and map features.

20. The at least one non-transitory storage media of claim 15, wherein the alternative task is a classification task.

* * * * *